(12) United States Patent
Tajiri

(10) Patent No.: US 8,392,491 B2
(45) Date of Patent: Mar. 5, 2013

(54) SHIFT CALCULATOR

(75) Inventor: Kunihiko Tajiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 12/827,569

(22) Filed: Jun. 30, 2010

(65) Prior Publication Data

US 2011/0004643 A1 Jan. 6, 2011

(30) Foreign Application Priority Data

Jul. 1, 2009 (JP) ................................. 2009-157288

(51) Int. Cl.
*G06F 15/00* (2006.01)
(52) U.S. Cl. ........................................................ 708/209
(58) Field of Classification Search .................... 708/209
See application file for complete search history.

(56) References Cited

U.S. PATENT DOCUMENTS 4,490,809 A * 12/1984 Ueda et al. .................... 708/209
4,653,019 A 3/1987 Hodge et al.

FOREIGN PATENT DOCUMENTS

JP 60-233729 11/1985
JP 62-115529 5/1987

* cited by examiner

*Primary Examiner* — Tan V. Mai
(74) *Attorney, Agent, or Firm* — Staas & Halsey LLP

(57) ABSTRACT

A shift calculator including a first shifter includes a right shifter configured to perform a right shift of 0 to 3 bits and a left shifter configured to perform a left shift of 0 to 3 bits, on input data of which a data width is N bits, in accordance with left/right selection signals, based on a shift amount of 3 bits or smaller out of an input shift amount, a rotator configured to perform a right rotate shift of 0 to N−4 bits or a left rotate shift of 0 to N−4 bits, on output data from said first shifter, in accordance with said left/right selection signals, based on a shift amount of 4 bits or greater out of the input shift amount, and a mask unit configured to perform mask processing in 4-bit increments on output data from said rotator based on mask signals.

10 Claims, 41 Drawing Sheets

FIG. 5

| SHIFT CONDITIONS | SELR | SRA | RSGN |
|---|---|---|---|
| LOGICAL LEFT SHIFT | 0 | 0 | 0 |
| LOGICAL RIGHT SHIFT | 1 | 0 | 0 |
| ARITHMETIC RIGHT SHIFT | 1 | 1 | D[63] |

FIG. 7A
FIG. 7B
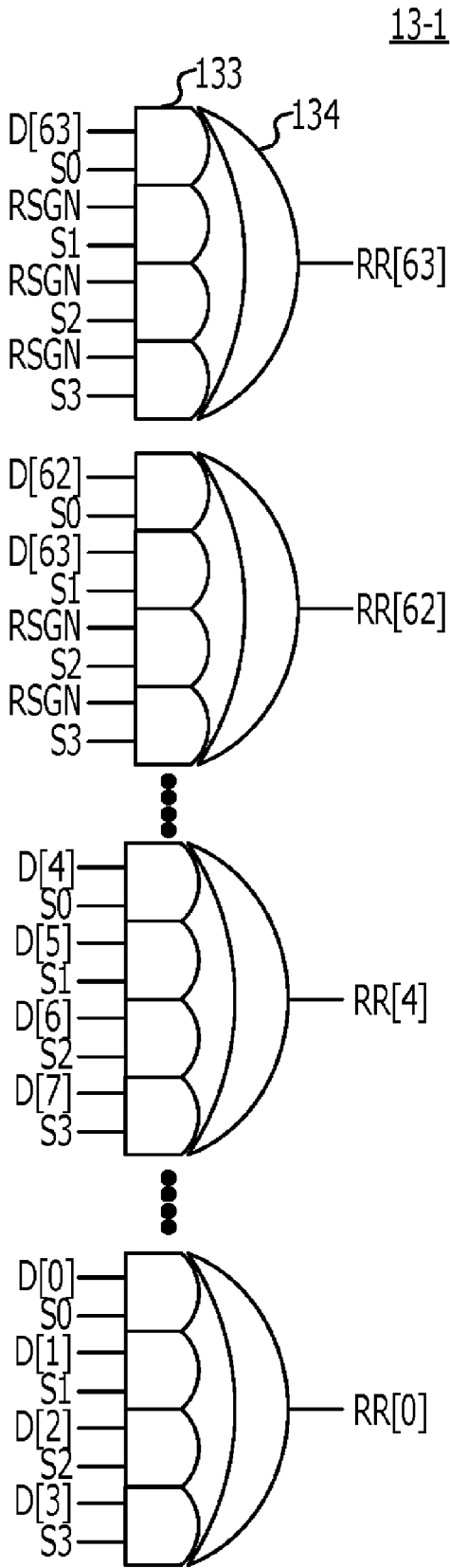
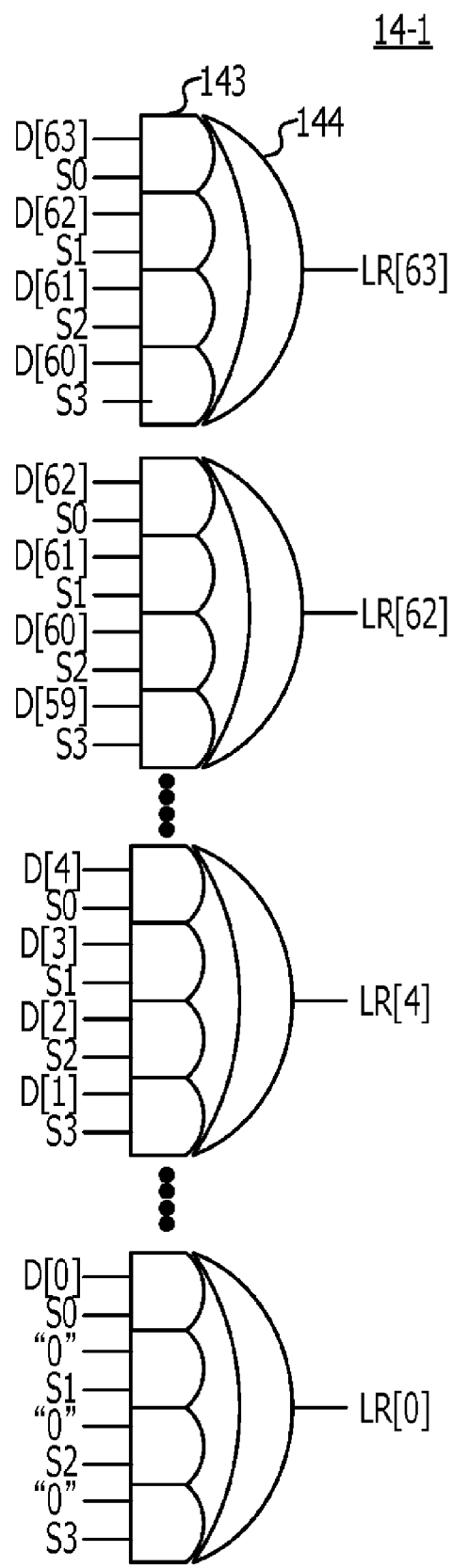

FIG. 9A
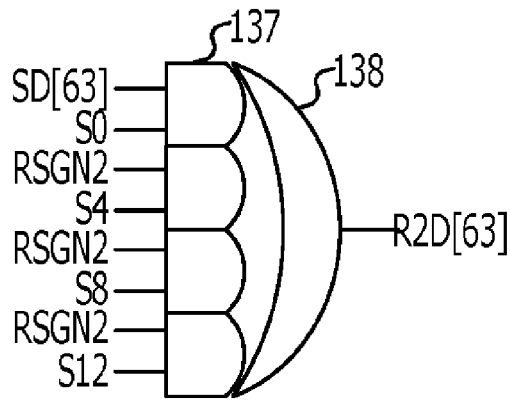
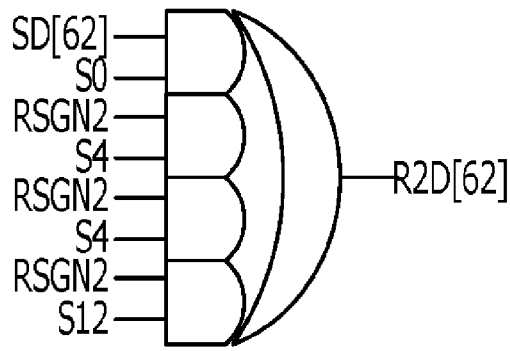
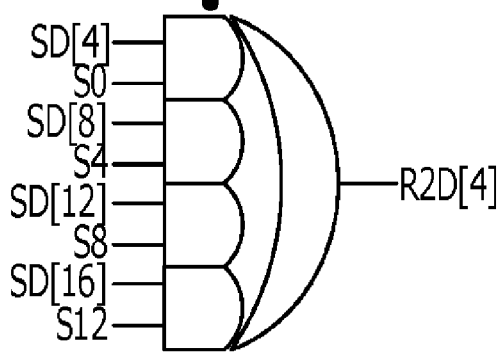
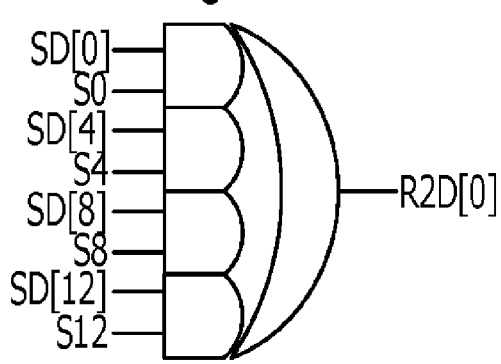
FIG. 9B
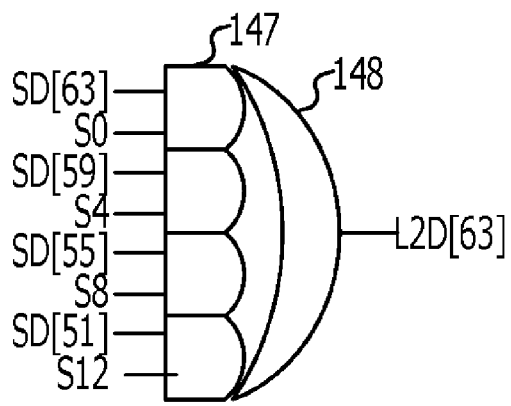
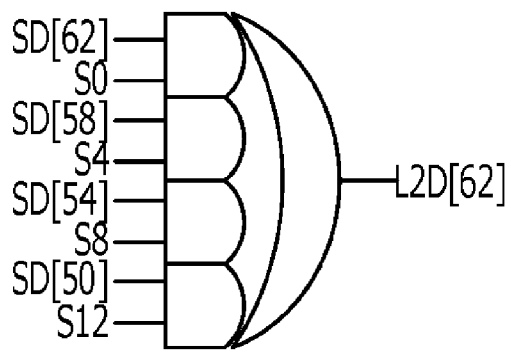
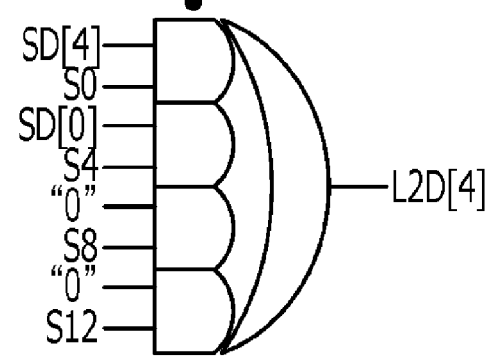
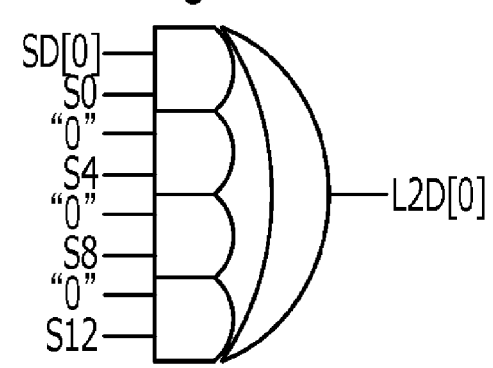

FIG. 11A
FIG. 11B
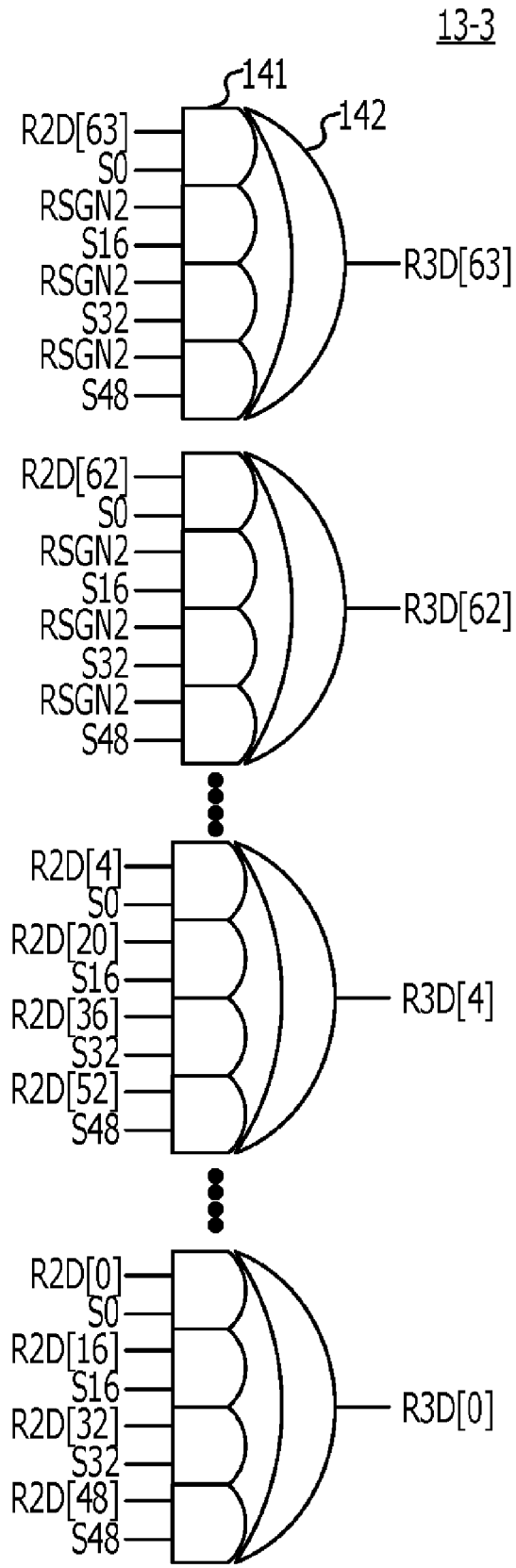
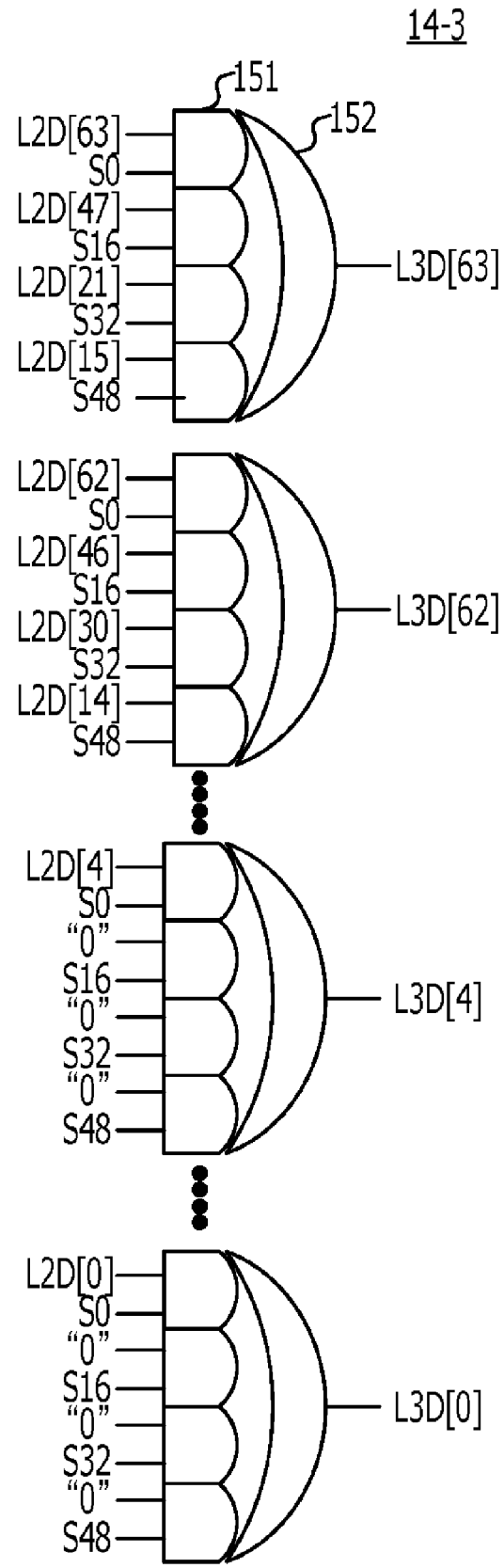

FIG. 12

| SA[1:0] | RP[1] | RP[0] |
|---|---|---|
| 00 | D[3]⊕D[2]⊕D[1]⊕D[0]⊕DP | D[3]⊕D[2]⊕D[1]⊕D[0] |
| 01 | DH[0]⊕D[7]⊕D[6]⊕D[5] | D[7]⊕D[6]⊕D[5]⊕D[0]⊕DP |
| 10 | DH[1]⊕DH[0]⊕D[7]⊕D[6] | D[7]⊕D[6]⊕D[1]⊕D[0]⊕DP |
| 11 | DH[2]⊕DH[1]⊕DH[0]⊕D[7] | D[7]⊕D[2]⊕D[1]⊕D[0]⊕DP |

FIG. 13

| SA[1:0] | LP[1] | LP[0] |
|---|---|---|
| 00 | D[3]⊕D[2]⊕D[1]⊕D[0]⊕DP | D[3]⊕D[2]⊕D[1]⊕D[0] |
| 01 | D[7]⊕D[2]⊕D[1]⊕D[0]⊕DP | D[2]⊕D[1]⊕D[0]⊕DL[7] |
| 10 | D[7]⊕D[6]⊕D[1]⊕D[0]⊕DP | D[1]⊕D[0]⊕DL[7]⊕DL[6] |
| 11 | D[7]⊕D[6]⊕D[5]⊕D[0]⊕DP | D[0]⊕DL[7]⊕DL[6]⊕DL[5] |

FIG. 14

R0BP[7]=SDP[15]⊕SDP[14]
R0BP[6]=SDP[13]⊕SDP[12]
...
R0BP[1]=SDP[3]⊕SDP[2]
R0BP[0]=SDP[1]⊕SDP[0]

R4BP[7]= "0" ⊕SDP[15]
R4BP[6]=SDP[14]⊕SDP[13]
...
R4BP[1]=SDP[4]⊕SDP[3]
R4BP[0]=SDP[2]⊕SDP[1]

FIG. 15

| SA2[3:2] | RBP[2] | RBP[1] |
|---|---|---|
| 00 | R2BP[2] | R2BP[1] |
| 01 | R2BP[4] | R2BP[3] |
| 10 | R2BP[6] | R2BP[5] |
| 11 | 0 | R2BP[7] |

FIG. 16

L0BP[7]=SDP[15]⊕SDP[14]
L0BP[6]=SDP[13]⊕SDP[12]
...
L0BP[1]=SDP[3]⊕SDP[2]
L0BP[0]=SDP[1]⊕SDP[0]

L4BP[7]=SDP[14]⊕SDP[13]
L4BP[6]=SDP[12]⊕SDP[11]
...
L4BP[1]=SDP[2]⊕SDP[1]
L4BP[0]=SDP[0]⊕"0"

FIG. 17

| SA2[3:2] | LBP[7] | LBP[6] |
|---|---|---|
| 00 | L2BP[2] | L2BP[6] |
| 01 | L2BP[5] | L2BP[4] |
| 10 | L2BP[3] | L2BP[2] |
| 11 | L2BP[1] | L2BP[0] |

FIG. 21

| MASK | DATA | CONDITIONS WHERE MASK IS 0 |
|---|---|---|
| (15) | [63:60] | $SA2[3:0] >= 0001( 4)$ : SA2[3:0] IS 1 OR GREATER (4-BIT SHIFT OR GREATER) |
| (14) | [59:56] | $SA2[3:0] >= 0010( 8)$ : SA2[3:0] IS 2 OR GREATER (8-BIT SHIFT OR GREATER) |
| (13) | [55:52] | $SA2[3:0] >= 0011(12)$ : SA2[3:0] IS 3 OR GREATER (12-BIT SHIFT OR GREATER) |
| (12) | [51:48] | $SA2[3:0] >= 0100(16)$ : SA2[3:0] IS 4 OR GREATER (16-BIT SHIFT OR GREATER) |
| (11) | [47:44] | $SA2[3:0] >= 0101(20)$ : SA2[3:0] IS 5 OR GREATER (20-BIT SHIFT OR GREATER) |
| (10) | [43:40] | $SA2[3:0] >= 0110(24)$ : SA2[3:0] IS 6 OR GREATER (24-BIT SHIFT OR GREATER) |
| ( 9) | [39:36] | $SA2[3:0] >= 0111(28)$ : SA2[3:0] IS 7 OR GREATER (28-BIT SHIFT OR GREATER) |
| ( 8) | [35:32] | $SA2[3:0] >= 1000(32)$ : SA2[3:0] IS 8 OR GREATER (32-BIT SHIFT OR GREATER) |
| ( 7) | [31:28] | $SA2[3:0] >= 1001(36)$ : SA2[3:0] IS 9 OR GREATER (36-BIT SHIFT OR GREATER) |
| ( 6) | [27:24] | $SA2[3:0] >= 1010(40)$ : SA2[3:0] IS 10 OR GREATER (40-BIT SHIFT OR GREATER) |
| ( 5) | [23:20] | $SA2[3:0] >= 1011(44)$ : SA2[3:0] IS 11 OR GREATER (44-BIT SHIFT OR GREATER) |
| ( 4) | [19:16] | $SA2[3:0] >= 1100(48)$ : SA2[3:0] IS 12 OR GREATER (48-BIT SHIFT OR GREATER) |
| ( 3) | [15:12] | $SA2[3:0] >= 1101(52)$ : SA2[3:0] IS 13 OR GREATER (52-BIT SHIFT OR GREATER) |
| ( 2) | [11: 8] | $SA2[3:0] >= 1110(56)$ : SA2[3:0] IS 14 OR GREATER (56-BIT SHIFT OR GREATER) |
| ( 1) | [ 7: 4] | $SA2[3:0] >= 1111(60)$ : SA2[3:0] IS 15 OR GREATER (60-BIT SHIFT OR GREATER) |
| ( 0) | [ 3: 0] | NEVER 0 |

FIG. 25

| OUTPUT OF SHIFT CALCULATOR 31 | OUTPUT OF ROTATOR 33 | MASK | SELR | RSGN2 |
|---|---|---|---|---|
| 0 | | 1 | — | — |
| 0 | | 0 | 0 | 1 |
| | 0 | 0 | 1 | 0 |
| | 1 | 0 | 1 | 1 |

FIG. 28

R0BP[7]=SDP[15]⊕SDP[14]
R0BP[6]=SDP[13]⊕SDP[12]
...
R0BP[1]=SDP[3] ⊕ SDP[2]
R0BP[0]=SDP[1] ⊕ SDP[0]

R4BP[7]=SDP[0]⊕SDP[15]
R4BP[6]=SDP[14]⊕SDP[13]
...
R4BP[1]=SDP[4] ⊕ SDP[3]
R4BP[0]=SDP[2] ⊕ SDP[1]

FIG. 29

| SA2[2:3] | RBP[2] | RBP[1] |
|---|---|---|
| | R2BP[2] | R2BP[1] |
| | R2BP[4] | R2BP[3] |
| | R2BP[6] | R2BP[5] |
| | R2BP[0] | R2BP[7] |
| 00 | | |
| 01 | | |
| 10 | | |
| 11 | | |

FIG. 35

| MASK | DATA | CONDITIONS WHERE MASK IS 0 |
|---|---|---|
| (31) | [127:124] : SA2[4:0] >= 00001( 4) | SA2[4:0] IS 1 OR GREATER (4-BIT SHIFT OR GREATER) |
| (30) | [123:120] : SA2[4:0] >= 00010( 8) | SA2[4:0] IS 2 OR GREATER (8-BIT SHIFT OR GREATER) |
| (29) | [119:116] : SA2[4:0] >= 00011(12) | SA2[4:0] IS 3 OR GREATER (12-BIT SHIFT OR GREATER) |
| (28) | [115:112] : SA2[4:0] >= 00100(16) | SA2[4:0] IS 4 OR GREATER (16-BIT SHIFT OR GREATER) |
| (27) | [111:108] : SA2[4:0] >= 00101(20) | SA2[4:0] IS 5 OR GREATER (20-BIT SHIFT OR GREATER) |
| (26) | [107:104] : SA2[4:0] >= 00110(24) | SA2[4:0] IS 6 OR GREATER (24-BIT SHIFT OR GREATER) |
| (25) | [103:100] : SA2[4:0] >=00111(28) | SA2[4:0] IS 7 OR GREATER (28-BIT SHIFT OR GREATER) |
| (24) | [99:96] : SA2[4:0] >= 01000(32) | SA2[4:0] IS 8 OR GREATER (32-BIT SHIFT OR GREATER) |
| (23) | [95:92] : SA2[4:0] >= 01001(36) | SA2[4:0] IS 9 OR GREATER (36-BIT SHIFT OR GREATER) |
| (22) | [91:88] : SA2[4:0] >= 01010(40) | SA2[4:0] IS 10 OR GREATER (40-BIT SHIFT OR GREATER) |
| (21) | [23:20] : SA2[4:0] >= 1011(44) | SA2[3:0] IS 11 OR GREATER (44-BIT SHIFT OR GREATER) |
| (20) | [83:80] : SA2[4:0] >= 01100(48) | SA2[4:0] IS 12 OR GREATER (48-BIT SHIFT OR GREATER) |
| (19) | [79:76] : SA2[4:0] >=01101(52) | SA2[4:0] IS 13 OR GREATER (52-BIT SHIFT OR GREATER) |
| (18) | [75: 72] : SA2[4:0] >= 01110(56) | SA2[4:0] IS 14 OR GREATER (56-BIT SHIFT OR GREATER) |
| (17) | [71:68] : SA2[4:0] >= 01111(60) | SA2[4:0] IS 15 OR GREATER (60-BIT SHIFT OR GREATER) |
| (16) | [67:64] : SA2[4:0] >= 10000(64) | SA2[4:0] IS 16 OR GREATER (64-BIT SHIFT OR GREATER) |
| (15) | [63:60] : SA2[4:0] >= 10001(68) | SA2[4:0] IS 17 OR GREATER (68-BIT SHIFT OR GREATER) |
| (14) | [59:56] : SA2[4:0] >= 10010(72) | SA2[4:0] IS 18 OR GREATER (72-BIT SHIFT OR GREATER) |
| (13) | [55:52] : SA2[4:0] >= 10011(76) | SA2[4:0] IS 19 OR GREATER (76-BIT SHIFT OR GREATER) |
| (12) | [51:48] : SA2[4:0] >= 10100(80) | SA2[4:0] IS 20 OR GREATER (80-BIT SHIFT OR GREATER) |
| (11) | [47:44] : SA2[4:0] >=10101(84) | SA2[4:0] IS 21 OR GREATER (84-BIT SHIFT OR GREATER) |
| (10) | [43:40] : SA2[4:0] >= 10110(88) | SA2[4:0] IS 22 OR GREATER (88-BIT SHIFT OR GREATER) |
| ( 9) | [39:36] : SA2[4:0] >= 10111(92) | SA2[4:0] IS 23 OR GREATER (92-BIT SHIFT OR GREATER) |
| ( 8) | [35:32] : SA2[4:0] >= 11000(96) | SA2[4:0] IS 24 OR GREATER (96-BIT SHIFT OR GREATER) |
| ( 7) | [31:28] : SA2[4:0] >= 11001(100) | SA2[4:0] IS 25 OR GREATER (100-BIT SHIFT OR GREATER) |
| ( 6) | [27:24] : SA2[4:0] >= 11010(104) | SA2[4:0] IS 26 OR GREATER (104-BIT SHIFT OR GREATER) |
| ( 5) | [23:20] : SA2[4:0] >= 11011(108) | SA2[4:0] IS 27 OR GREATER (108-BIT SHIFT OR GREATER) |
| ( 4) | [19:16] : SA2[4:0] >= 11100(112) | SA2[4:0] IS 28 OR GREATER (112-BIT SHIFT OR GREATER) |
| ( 3) | [15:12] : SA2[4:0] >= 11101(116) | SA2[4:0] IS 29 OR GREATER (116-BIT SHIFT OR GREATER) |
| ( 2) | [11: 8] : SA2[4:0] >= 11110(120) | SA2[4:0] IS 30 OR GREATER (120-BIT SHIFT OR GREATER) |
| ( 1) | [ 7: 4] : SA2[4:0] >= 11111(52) | SA2[4:0] IS 31 OR GREATER (124-BIT SHIFT OR GREATER) |
| ( 0) | [ 3: 0] : NEVER 0 | |

FIG. 36

R0BP[15]=SDP[30]
R0BP[14]=SDP[28]
...
R0BP[1]=SDP[2]
R0BP[0]=SDP[0]

R4BP[15]=SDP[31]
R4BP[14]=SDP[29]
...
R4BP[1]=SDP[3]
R4BP[0]=SDP[1]

R0BP[15]=SDP[31]⊕SDP[30]
R0BP[14]=SDP[29]⊕SDP[28]
...
R0BP[1]=SDP[3] ⊕ SDP[2]
R0BP[0]=SDP[1] ⊕ SDP[0]

R4BP[15]=SDP[0]⊕SDP[31]
R4BP[14]=SDP[30]⊕SDP[29]
...
R4BP[1]=SDP[4] ⊕ SDP[3]
R4BP[0]=SDP[2] ⊕ SDP[1]

FIG. 37

| SA2[2:3] | | |
|---|---|---|
| | R3P[10] | RSP[9] |
| 00 | R2P[10] | R2P[9] |
| 01 | R2P[12] | R2P[11] |
| 10 | R2P[14] | R2P[13] |
| 11 | R2BP[0] | R2P[15] |

FIG. 38

| SA2[4] | R4P[8] | R4P[7] |
|---|---|---|
| 0 | R3P[8] | R3P[7] |
| 1 | R3P[0] | R3P[15] |

SHIFT CALCULATOR

CROSS-REFERENCE TO RELATED APPLICATIONS

This application is based upon and claims the benefit of priority of the prior Japanese Patent Application No. 2009-157288, filed on Jul. 1, 2009, the entire contents of which are incorporated herein by reference.

FIELD

Embodiments discussed herein relates to a shift calculator.

BACKGROUND

A shift calculator is used for performing logical shift or arithmetic shift. A shift calculator which has an input/output data width of 64 bits and a shift amount of 0 to 63 bits has a right shift function and left shift function, and performs logical shift and arithmetic shift. With regard to parity protection, parity propagation is assumed. In the event that input data and input parity are unmatched, output data and output parity will be unmatched at some point following shifting.

FIG. 1 is a diagram illustrating an example the configuration of a 64-bit left/right shifter. The left/right shifter 1 has a 64-bit right shifter 2, a 64-bit left shifter 3 and a selector 4. The shifters 2 and 3 receive 64-bit input data and 6-bit shift amounts. The selector 4 selects the shift results of one of the shifter 2 or the shifter 3 in accordance with a selection signal, and outputs as 64-bit output data.

FIG. 2 is a diagram illustrating an example of a right shifter 2. The right shifter 2 has right shifters 2-1, 2-2, and 2-3 of which shift amount of 2 bits is input. The right shifter 2-1 shifts with width of 0, 1, 2, and 3 bits, the right shifter 2-2 shifts with width of 0, 4, 8, and 12 bits, and the right shifter 2-3 shifts with width of 0, 16, 32, and 48 bits.

FIG. 3 is a diagram illustrating an example of a left shifter 3. The left shifter 3 has left shifters 3-1, 3-2, and 3-3 of which shift amount of 2 bits is input. The left shifter 3-1 shifts with width of 0, 1, 2, and 3 bits, the left shifter 3-2 shifts with width of 0, 4, 8, and 12 bits, and the left shifter 3-3 shifts with width of 0, 16, 32, and 48 bits.

The shifters 2 and 3 may be formed of rotator shifters.

FIG. 4 is a diagram illustrating an example of a left/right shifter operating at 2τ cycle. The left/right shifter 11 illustrated in FIG. 4 is used with microprocessors having a relatively high operating frequency, for example. While the left/right shifter 11 basically uses the same operating principle as the shifter 1 illustrated in FIG. 1, the shifters formed in three stages as illustrated in FIGS. 2 and 3 are divided into two portions, with a latch circuit provided between the divided shifters.

The left/right shifter 11 has a conversion circuit 12 for converting 1-byte parity into 4-bit parity, first through third right shifters 13-1 through 13-3, first through third left shifters 14-1 through 14-3, a selector 15, a 64+16-bit latch circuit 16, a conversion circuit 17 for converting 4-bit parity into 1-byte parity, a selector 18, 1-bit latch circuits 19 and 20, and a 4-bit latch circuit 21. In FIG. 4, SRA denotes a signal indicating arithmetic right shift, D[63:0] denotes input data, DP[7:0] denotes input parity, SELR denotes a left/right selection signal, SA denotes a signal indicating shift amount, and RSGN denotes a bit for the sign SIGN. SA2 indicates the 2τ'th shift amount, with the upper 4 bits of the shift amount SA having been latched at the latch circuit 21, while RSGN2 indicates the bit RSGN of the sign SIGN generated the 1τ'th shift latched at the latch circuit 19.

In order to reduce the number of bits at the latch circuit 16, the shift results of the first shifters 13-1 and 14-1 are selected at the selector 15 in response to the left/right selection signal SELR, and stored in the latch circuit 16, when the 1τ'th shift at the first shifters 13-1 and 14-1 has ended. Thus, for the 1τ'th shift, the first shifters 13-1 and 14-1 are used to perform right shift and left shift of 0, 1, 2, and 3 bits. Also, for the 2τ'th shift, the second and third shifters 13-2, 14-2, 13-3, and 14-3, are used to perform 0 to 60 bit right shift and left shift in 4-bit increments. For the 2τ'th shift, the second shifters 13-2 and 14-2 are used to perform 0, 4, 8, and 12 bit right shift and left shift, and the third shifters 13-3 and 14-3 are used to perform 0, 16, 32, and 48 bit right shift and left shift, with the shift results of the third shifters 13-3 and 14-3 being selected by the selector 18 and in response to the left/right selection signal SELR, and output.

The left/right selection signal SELR, the arithmetic right shift signal SRA, and the sign SIGN bit RSGN satisfy a relationship such as illustrated in FIG. 5, in accordance with shift conditions.

FIGS. 6 through 7B are circuit diagrams illustrating an example of the first shifters 13-1 and 14-1. To facilitate description, only signals relating to the input data D are illustrated in FIGS. 6 through 7B. The first shifters 13-1 and 14-1 generate selection signals S0 through S3 from 2-bit shift amount SA[1:0], by a circuit unit having two inverters 131 and four AND circuits 132 connected as illustrated in FIG. 6. The first shifter 13-1 includes 64 4-to-1 selectors using AND-OR circuits having four AND circuits 133 and one OR circuit 134 as illustrated in FIG. 7A. The first shifter 14-1 includes 64 4-to-1 selectors using AND-OR circuits having four AND circuits 143 and one OR circuit 144 as illustrated in FIG. 7B. RR represents the results of logical or arithmetic right shift (right shift of 0, 1, 2, and 3 bits) by the right shifter 13-1, and LR represents the results of logical or arithmetic right shift (left shift of 0, 1, 2, and 3 bits) by the left shifter 14-1.

FIGS. 8 through 9B are circuit diagrams illustrating an example of the second shifters 13-2 and 14-2. To facilitate description, only signals relating to the output data SD of the latch circuit 16 are illustrated in FIGS. 8 through 9B. The second shifters 13-2 and 14-2 generate selection signals S0, S4, S8 and S12 from 2-bit shift amount SA2[1:0], by a circuit unit having two inverters 135 and four AND circuits 136 connected as illustrated in FIG. 8. The second shifter 13-2 includes 64 4-to-1 selectors using AND-OR circuits having four AND circuits 137 and one OR circuit 138 as illustrated in FIG. 9A. The second shifter 14-2 includes 64 4-to-1 selectors using AND-OR circuits having four AND circuits 147 and one OR circuit 148 as illustrated in FIG. 9B. R2D represents the results of logical or arithmetic right shift (right shift of 0, 4, 8, and 12 bits) by the second right shifter 13-2, and L2D represents the results of logical or arithmetic right shift (left shift of 0, 4, 8, and 12 bits) by the second left shifter 14-2.

FIGS. 10 through 11B are circuit diagrams illustrating an example of the third shifters 13-3 and 14-3. To facilitate description, only signals relating to the output data R2D and L2D of the second shifters 13-2 and 14-2 are illustrated in FIGS. 10 through 11B. The third shifters 13-3 and 14-3 generate selection signals S0, S16, S32 and S48 from 2-bit shift amount SA2[3:2] by a circuit unit having two inverters 139 and four AND circuits 140 connected as illustrated in FIG. 10. The third shifter 13-3 includes 64 4-to-1 selectors using AND-OR circuits having four AND circuits 141 and one OR circuit 142 as illustrated in FIG. 11A. The third shifter 14-3 includes 64 4-to-1 selectors using AND-OR circuits having four AND circuits 151 and one OR circuit 152 as illustrated in FIG. 11B. R3D represents the results of logical or arithmetic right shift (right shift of 0, 16, 32, and 48 bits) by the third right shifter 13-3, and L3D represents the results of logical or arithmetic right shift (left shift of 0, 16, 32, and 48 bits) by the third left shifter 14-3.

As for parity, four bit parities of performing 0-bit, 1-bit, 2-bit, and 3-bit right shift and left shift are each generated for the 1τ'th shift, and 4-bit parity corresponding to shifted data is selected using a 4-to-1 selector having AND-OR circuits such as illustrated in FIG. 7. With regard to one arbitrary byte, right shift 4-bit parity RP[1:0] and left shift 4-bit parity LP[1:0] are obtained from data D[7:0] and byte parity DP (EOR (Exclusive-OR) of D[7:0]) as follows.

FIG. 12 illustrates the right shift 4-bit parity RP[1:0] in the case of right shift.

FIG. 13 illustrates the left shift 4-bit parity LP[1:0] in the case of left shift.

The shift amount of 0 to 3 bits is illustrated as SA[1:0], data one byte above the object byte as DH[7:0], and data one byte below as DL[7:0]. Also, for the 2τ'th shift, byte parities of having performed right shift and left shift of 0 and 4 bytes are generated from 4-bit parity from the latch circuit 16, and byte parities corresponding to the data shifted by shifting with the second and third shifters 13-2, 14-2, 13-3, and 14-3, are obtained.

First, the parity shift corresponding to right shift of data by 0, 4, 8, and 12 bits is obtained as illustrated in FIG. 14 with byte parity at the time of 0 bit right shift as R0BP[7:0] and byte parity at the time of 4 bit right shift as R4BP[7:0].

The byte parity at the time of 8-bit right shift is equivalent to the 8 bits of 0,R0BP[7:1], and the byte parity at the time of 12-bit right shift is equivalent to the 8 bits of 0,R4BP[7:1]. Therefore, the second right shifter 13-2 may select R0BP[7:0] and R4BP[7:0].

Also, the parity shift corresponding to right shift of data by 0, 16, 32, and 48 bits is the same as 0, 2, 4, and 6 bit shift of 8-bit data, since this is a byte (8-bit) parity shift. If expressing the parity following shifting at the third right shifter 13-3 as RBP[7:0], RBP[2:1] for example is as illustrated in FIG. 15.

Next, the parity shift corresponding to left shift of data by 0, 4, 8, and 12 bits is obtained as illustrated in FIG. 16 with byte parity at the time of 0 bit left shift as L0BP[7:0] and byte parity at the time of 4 bit left shift as L4BP[7:0].

The byte parity at the time of 8-bit left shift is equivalent to the 8 bits of L0BP[6:0], 0, and the byte parity at the time of 12-bit left shift is equivalent to the 8 bits of L4BP[6:0], 0. Therefore, the second left shifter 14-2 may select L0BP[7:0] and L4BP[7:0].

Also, the parity shift corresponding to left shift of data by 0, 16, 32, and 48 bits is the same as 0, 2, 4, and 6 bit shift of 8-bit data, since this is a byte (8-bit) parity shift. If expressing the parity following shifting at the third left shifter 14-3 as LBP[7:0], LBP[7:6] for example is as illustrated in FIG. 17.

The above related art is described in Japanese Unexamined Patent Application Publication No. 60-233729 and Japanese Unexamined Patent Application Publication No. 62-115529.

The above-described shift calculator has multiple stages, so not only is the circuit scale great, but also the standby power, or static power, is great. Further, there has been problem in that with shift calculators having right shift circuits and left shift circuits, even if one side is being used the other side wastes active power, or dynamic power, due to circuit operations. While an arrangement can be made with a rotator configuration as described in Japanese Unexamined Patent Application Publication No. 60-233729, the number of logical states from input to output is great, and there has been a problem that timing penalty is great.

SUMMARY

According to an aspect of the invention, a shift calculator including first shifter includes a right shifter configured to perform right shift of 0 to 3 bits and a left shifter configured to perform left shift of 0 to 3 bits, on input data of which data width is N bits, in accordance with left/right selection signals, based on a shift amount of 3 bits or smaller out of input shift amount, a rotator configured to perform right rotate shift of 0 to N−4 bits or left rotate shift of 0 to N−4 bits, on output data from said first shifter, in accordance with said left/right selection signals, based on a shift amount of 4 bits or greater out of input shift amount, and a mask unit configured to perform mask processing in 4-bit increments on output data from said rotator based on mask signals.

The above-described embodiments of the present invention are intended as examples, and all embodiments of the present invention are not limited to including the features described above.

BRIEF DESCRIPTION OF THE DRAWINGS

FIG. 5 is a diagram illustrating an arithmetic shift signal SRA and bit RSGN of the sign SIGN, in accordance with shift conditions;

FIGS. 7A and 7B are circuit diagrams illustrating an example of the first shifter;

FIGS. 9A and 9B are circuit diagrams illustrating an example of the second shifter;

FIGS. 11A and 11B are circuit diagrams illustrating an example of the third shifter;

FIG. 12 is a diagram illustrating right shift 4-bit parity RP[1:0] in the case of right shift;

FIG. 13 is a diagram illustrating left shift 4-bit parity LP[1:0] in the case of left shift;

FIG. 14 is a diagram illustrating byte parity R0BP[7:0] in the case of 0-bit right shift, and byte parity R4BP[7:0] in the case of 4-bit right shift;

FIG. 15 is a diagram illustrating RBP[2:1];

FIG. 16 is a diagram illustrating byte parity L0BP[7:0] in the case of 0-bit left shift, and byte parity L4BP[7:0] in the case of 4-bit left shift;

FIG. 17 is a diagram illustrating LBP[7:6];

FIG. 21 illustrates masks;

FIG. 25 illustrates output of the shift calculator;

FIG. 28 illustrates parities R0BP[7] through R0BP[0] and parities R4BP[7] through R4BP[0];

FIG. 29 illustrates parity RBP[2:1];

FIG. 35 illustrates masks;

FIG. 36 illustrates parities R0BP[15] through R0BP[0] and parities R4BP[15] through R4BP[0];

FIG. 37 illustrates parity R3P[10:9]; and

FIG. 38 illustrates parity R4P[8:7].

DESCRIPTION OF EMBODIMENTS

Figure 1:
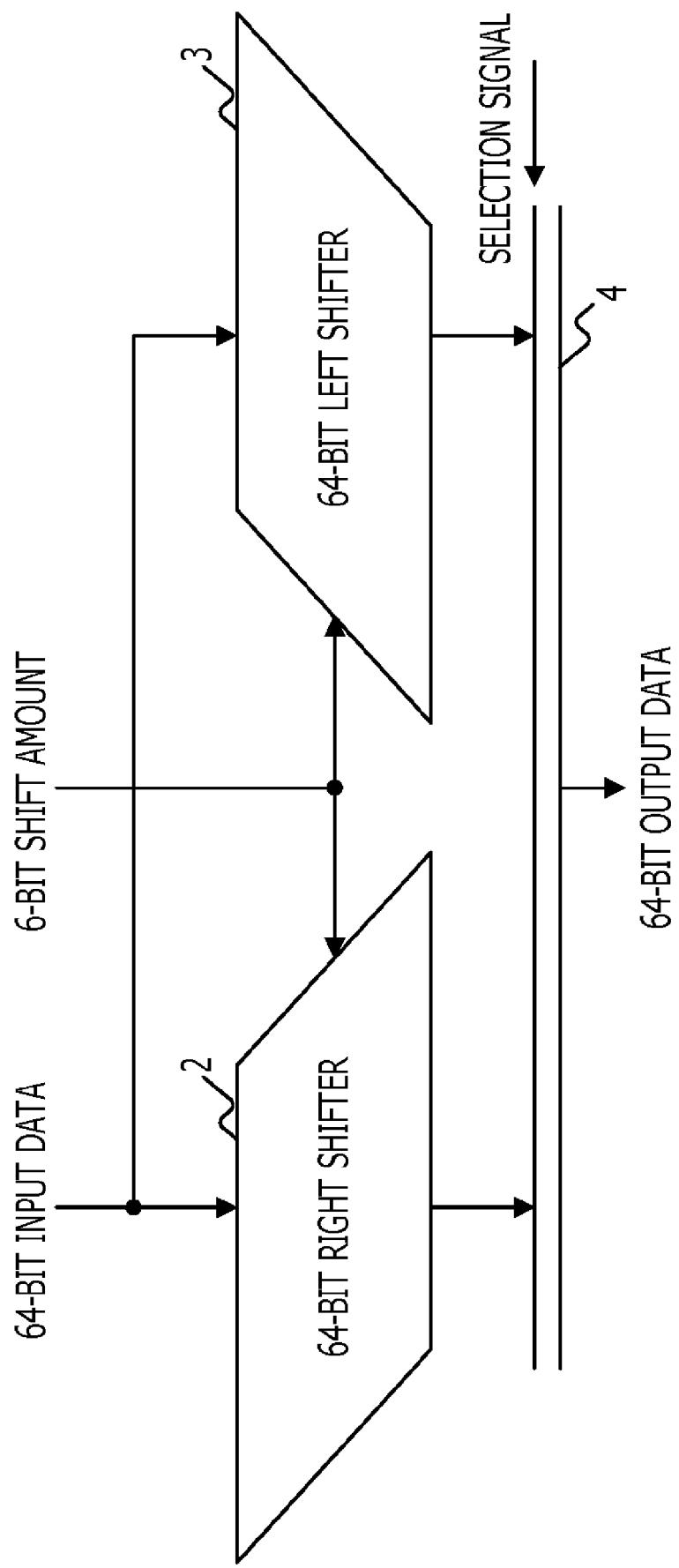
FIG. 1 is a diagram illustrating an example of a 64-bit left/right shifter.
Figure 2:
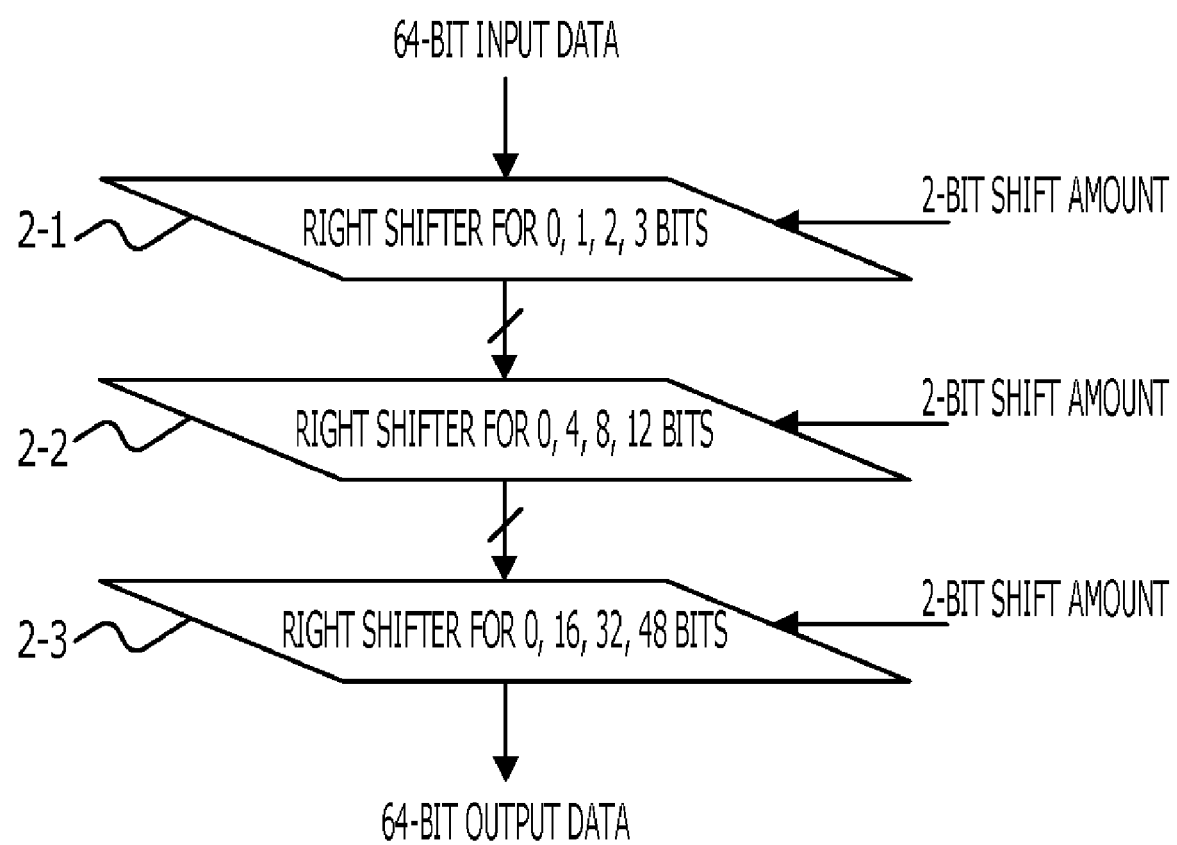
FIG. 2 is a diagram illustrating an example of a right shifter.
Figure 3:
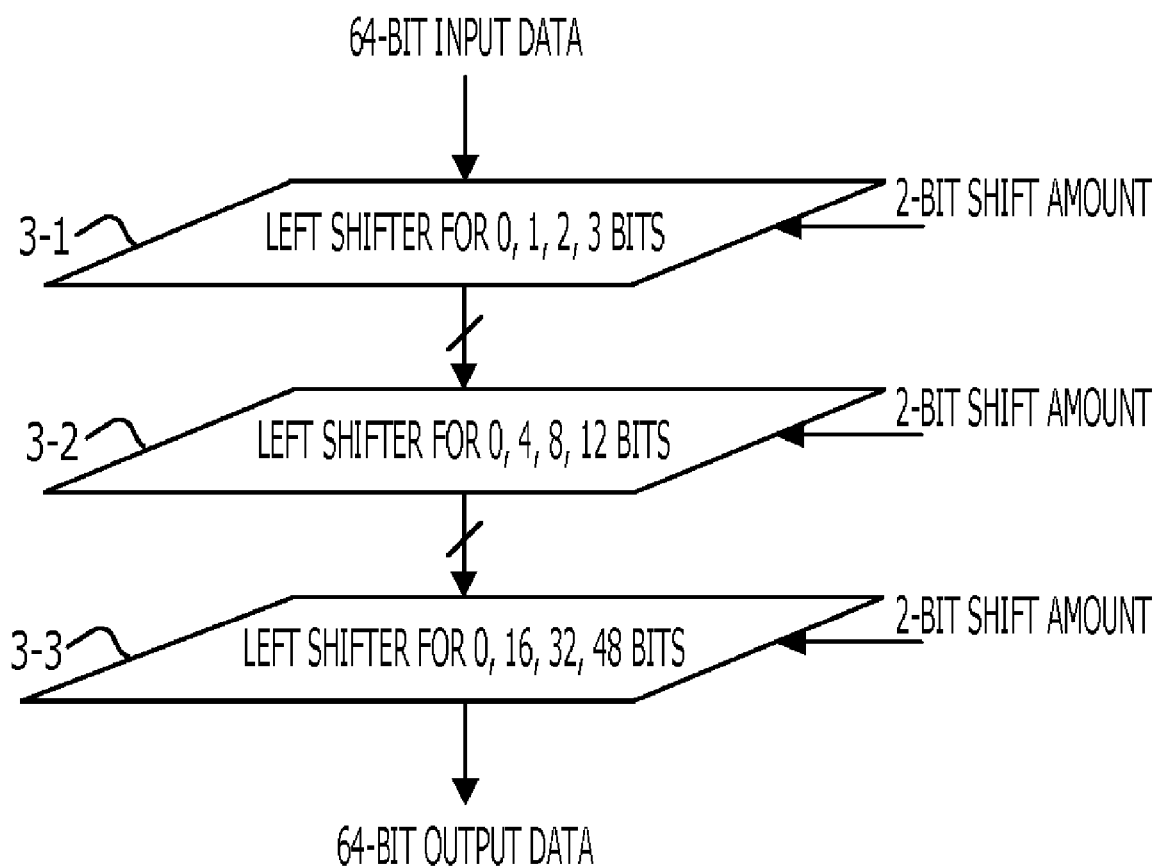
FIG. 3 is a diagram illustrating an example of a left shifter.

Reference may now be made in detail to embodiments of the present invention, examples of which are illustrated in the accompanying drawings, wherein like reference numerals refer to like elements throughout.

An embodiment of shift calculator of the invention includes a right shifter and left shifter for performing 0 to 3 bit right or left shift on input data having a data width of N bits in accordance with left or right selection signals, a rotator unit for performing 0 to N−4 bit right rotate shift or left rotate shift on output data from the right shifter or left shifter in accordance with left or right selection signals, based on the shift amount of 4 bites or more, out of the input shift amount, and a mask circuit for performing mask processing in 4-bit increments on the output data of the rotator unit based on mask signals.

The shift calculator circuit has a relatively small scale, and standby power (or static power) and active power (or dynamic power) are relatively small.

Embodiments of the shift calculator according to the present invention will be described.

Figure 4:
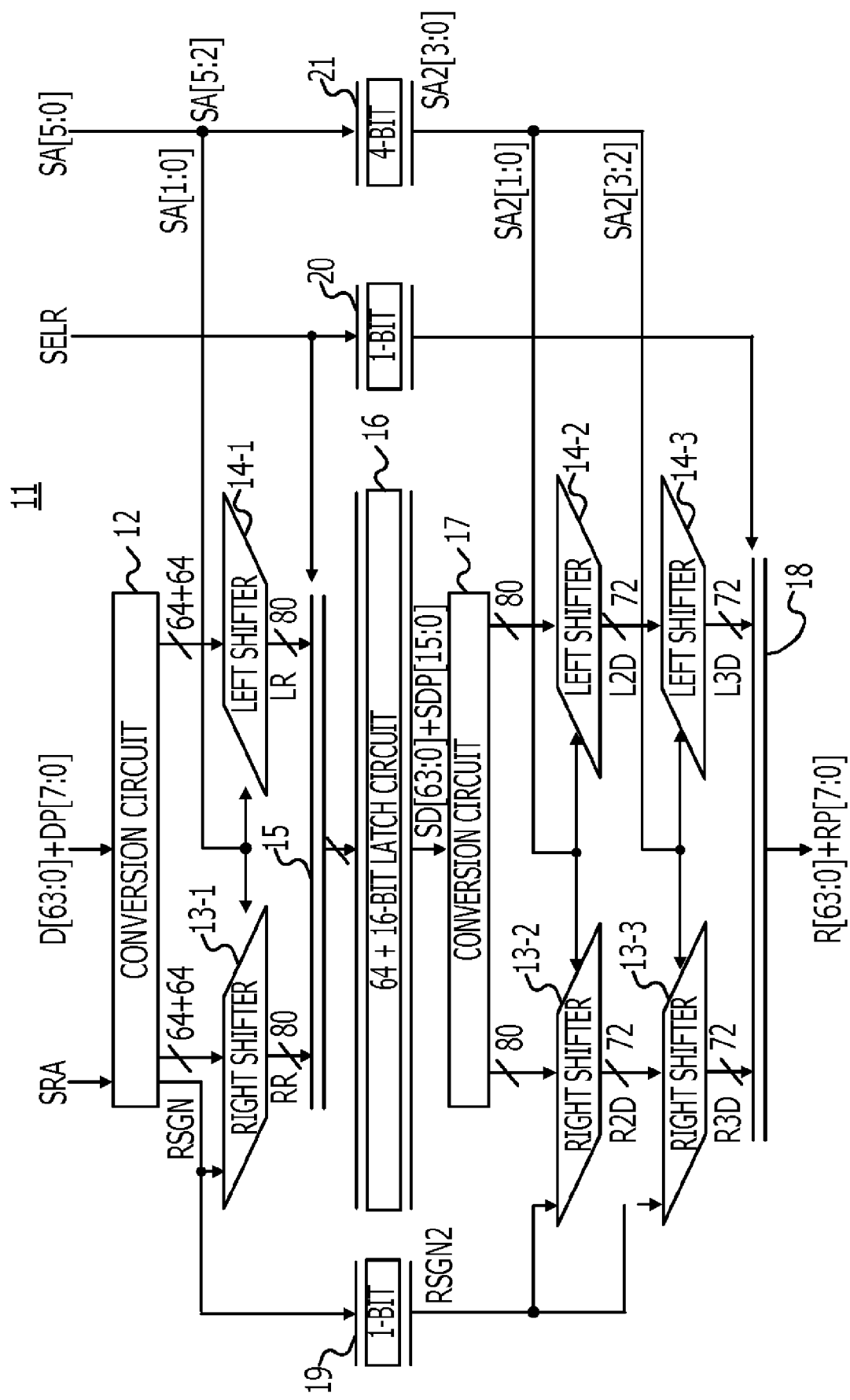
FIG. 4 is a diagram illustrating an example of a left/right shifter operating under 2τ cycles.
Figure 6:
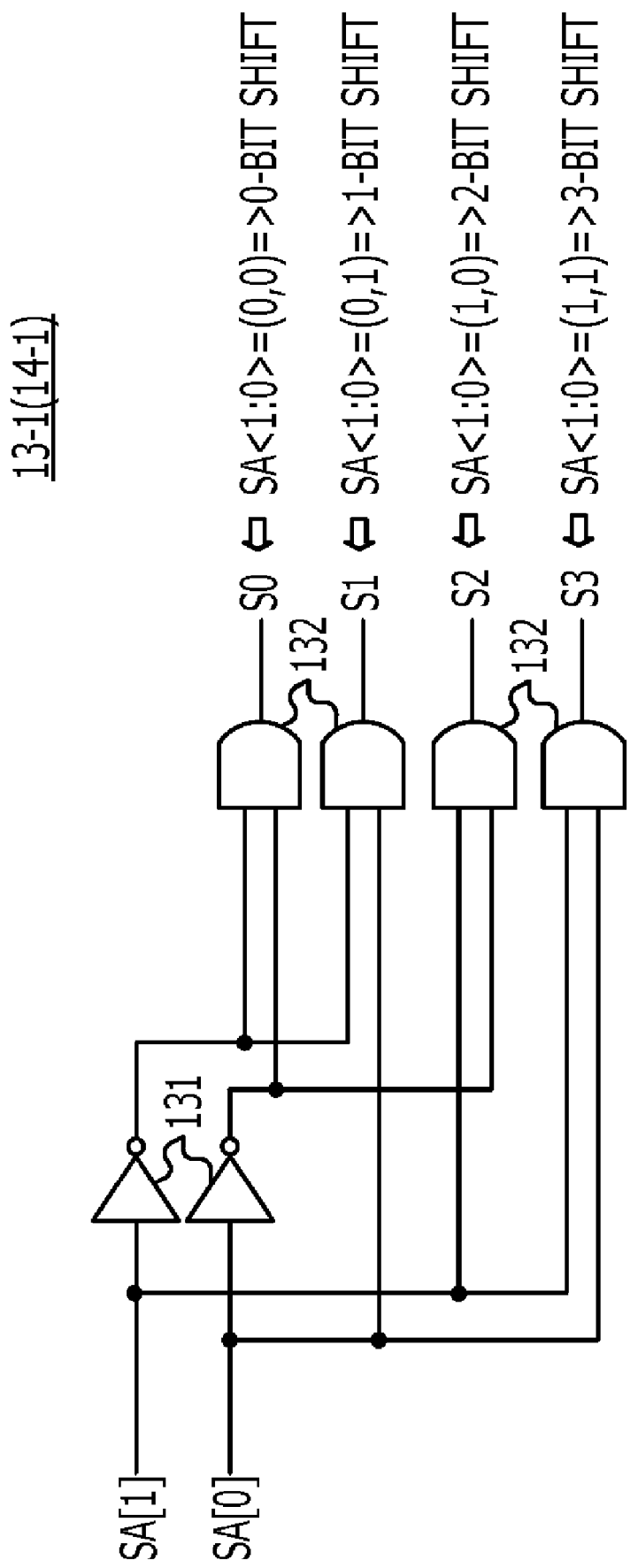
FIG. 6 is a circuit diagram illustrating an example of a first shifter.
Figure 8:
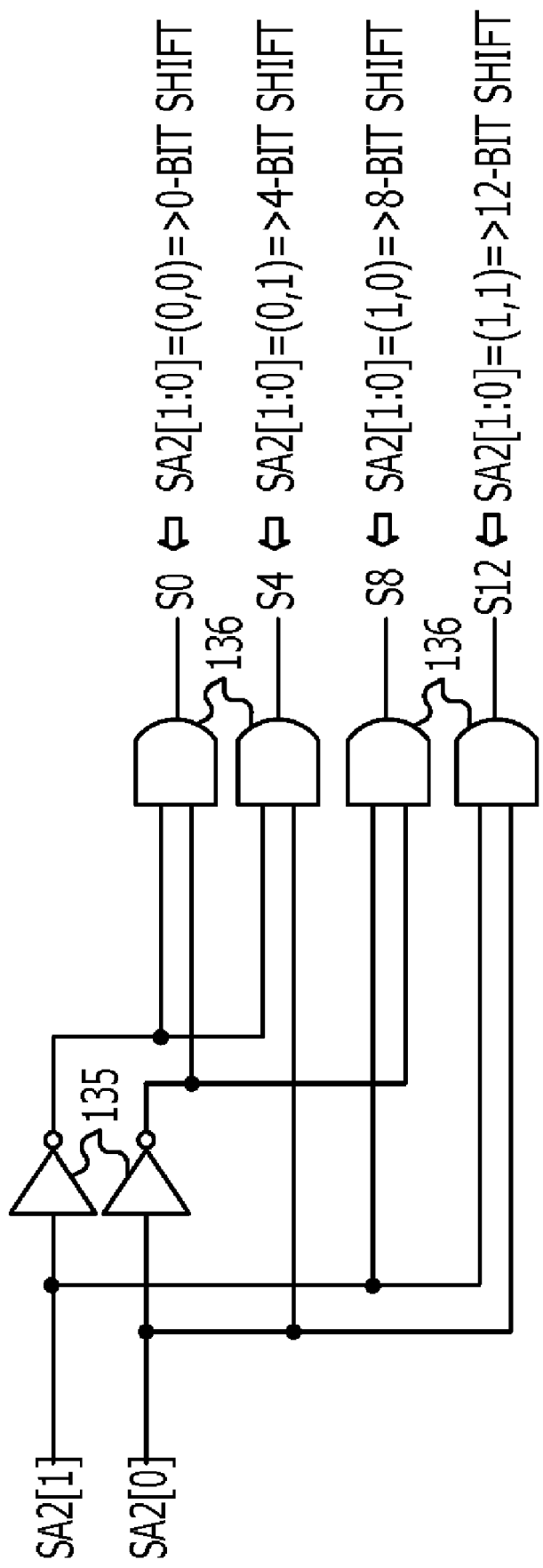
FIG. 8 is a circuit diagram illustrating an example of a second shifter.
Figure 10:
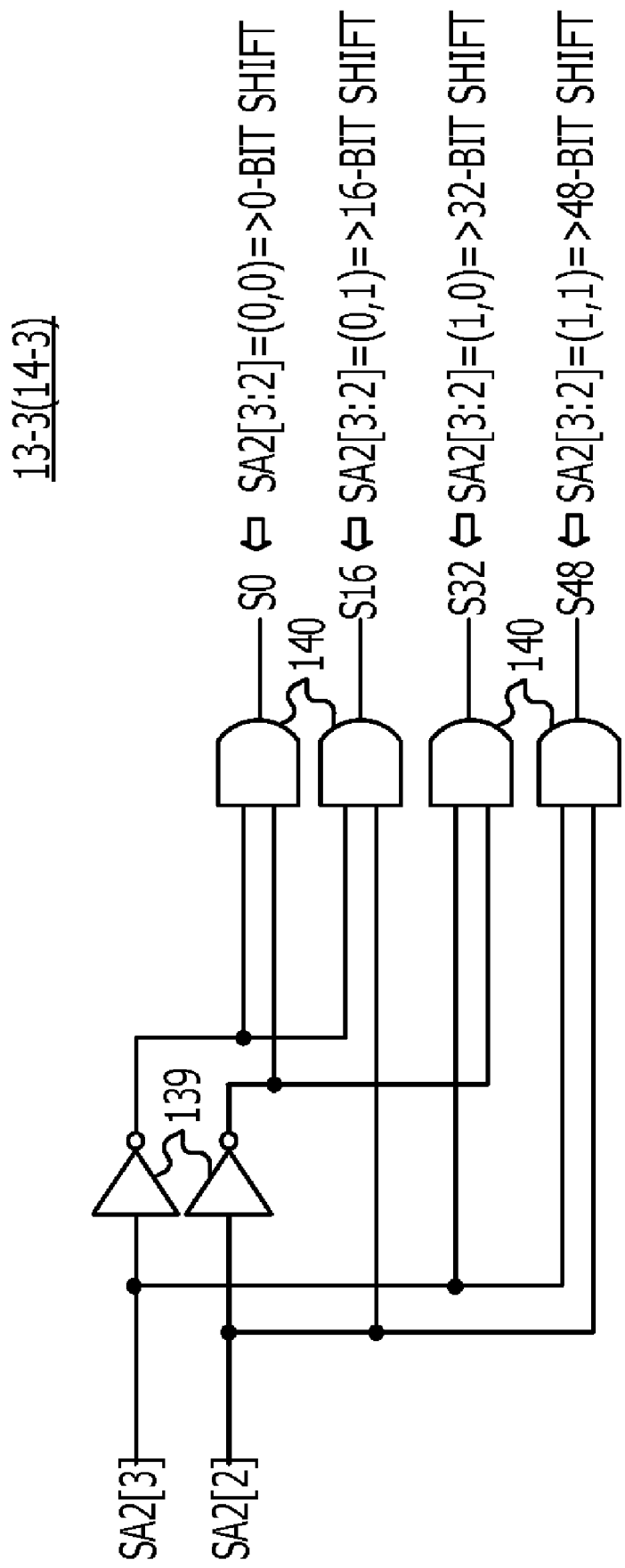
FIG. 10 is a circuit diagram illustrating an example of a third shifter.
Figure 18:
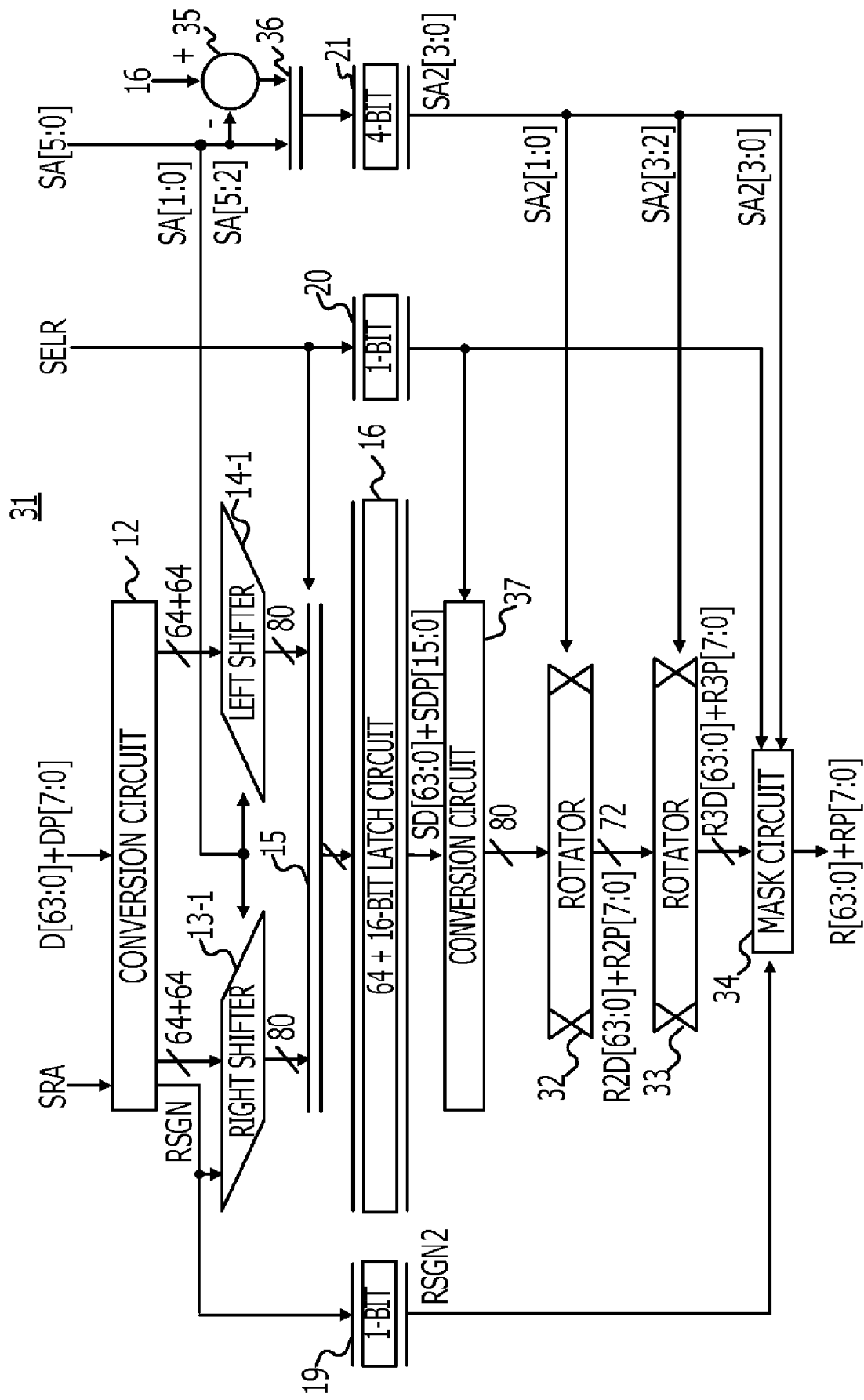
FIG. 18 is a diagram illustrating a shift calculator according to a first embodiment of the present invention.

FIG. 18 is a diagram illustrating a shift calculator according to an embodiment of the present invention. Of the components illustrated in FIG. 18, those which are the same as those in FIG. 4 are denoted with the same reference numerals, and description thereof will be omitted.

The shifter 31 illustrated in FIG. 18 has a conversion circuit 12 for converting 1-byte parity into 4-bit parity, a first right shifter 13-1, a first left shifter 14-1, a selector 15, a 64+16-bit latch circuit 16, a conversion circuit 37 for converting 4-bit parity into 1-byte parity, a rotator 32 making up a second shifter, a rotator 33 making up a third shifter, a mask circuit 34, 1-bit latch circuits 19 and 20, a 4-bit latch circuit 21, a calculator circuit 35, and a selector 36.

In FIG. 18, SRA denotes a signal indicating arithmetic right shift, D[63:0] denotes input data, DP[7:0] denotes input parity, SELR denotes a left/right selection signal, SA denotes a signal indicating shift amount, and RSGN denotes a bit for the sign SIGN. SA2 indicates the 2τ'th shift amount, with information generated at the calculator circuit 35 and selector 36 from the upper 4 bits of the shift amount SA input at the 1τ'th shift having been latched at the latch circuit 21, while RSGN2 indicates the bit RSGN of the sign SIGN generated the 2τ'th shift latched at the latch circuit 19. Also, SD[63:0] indicates the output data of the latch circuit 16, and SDP[15:0] indicates the output parity of the latch circuit 16.

With the first embodiment, output of the rotator 33 is masked by a mask circuit 34 in accordance with mask signals generated from the 2τ'th shift amount SA2, thereby performing right shift and left shift of 64-bit data. With shift amount of SA[5:0] and 2τ'th shift amount of SA2[3:0], SA2[3:0]=SA[5:2] in the example illustrated in FIG. 4, but data shift by the calculator circuit 35, selector 36, and latch circuit 21, is operated as follows.

SELR=0:SA2[3:0]=16 (10,000 in binary)−SA[5:2]

SELR=1:SA2[3:0]=SA[5:2]

With the arrangement in FIG. 18, two stages of rotators 32 and 33 are combined to realize right rotate shift of 0 to 60 bit data in increments of 4 bits. The rotator 32 executes right rotate shift of 0-bit, 4-bit, 8-bit, and 12-bit data, and the rotator 33 executes right rotate shift of 0-bit, 16-bit, 32-bit, and 48-bit data.

Figure 19A:
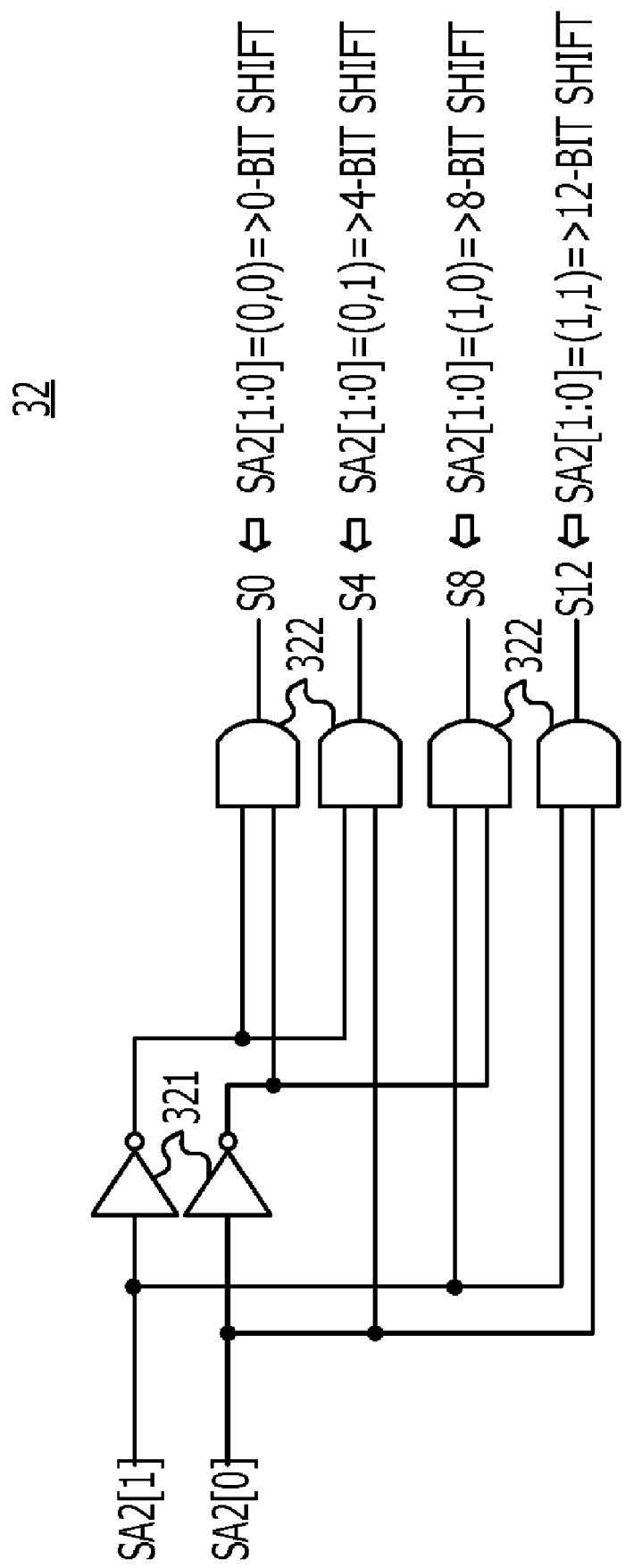
FIGS. 19A and 19B are circuit diagrams illustrating an example of a rotator making up a second shifter.
Figure 19B:
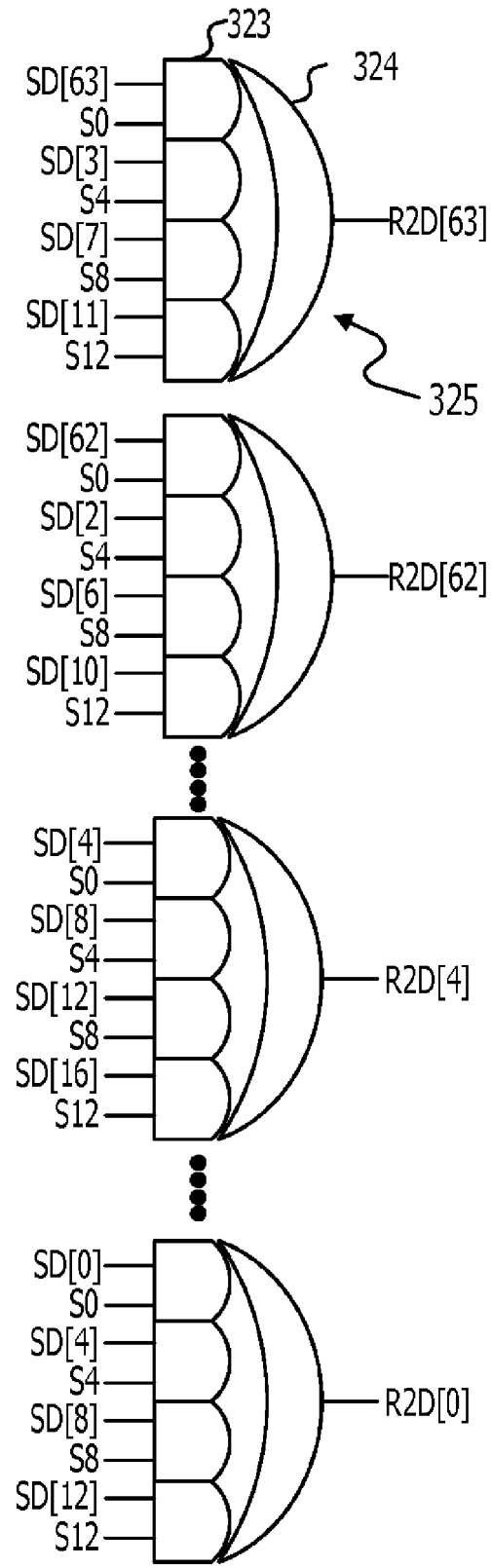

FIGS. 19A and 19B are circuit diagrams illustrating an example of a configuration of the rotator 32. To facilitate description, only signals relating to the output data SD of the latch circuit 16 are illustrated in FIGS. 19A and 19B. The rotator 32 has two inverters 321 and four AND circuits 322, and 64 4-to-1 selectors 325. The 4-to-1 selectors 325 are each realized by an AND-OR circuit having four AND circuits 323 and one OR circuit 324. The circuit portion having two inverters 321 and four AND circuits 322 generates selection signals S0, S4, S8 and S12 from 2-bit shift amount SA2[1:0]. The selection signals S0, S4, S8 and S12 indicate rotate shift of 0 bits, 4 bits, 8 bits, and 12 bits, respectively. Note that R2D and R2P in FIG. 18 show the results of rotate shift (right rotate shift of 0 bits, 4 bits, 8 bits, and 12 bits) on the data and parity by the rotator 32.

Figure 20A:
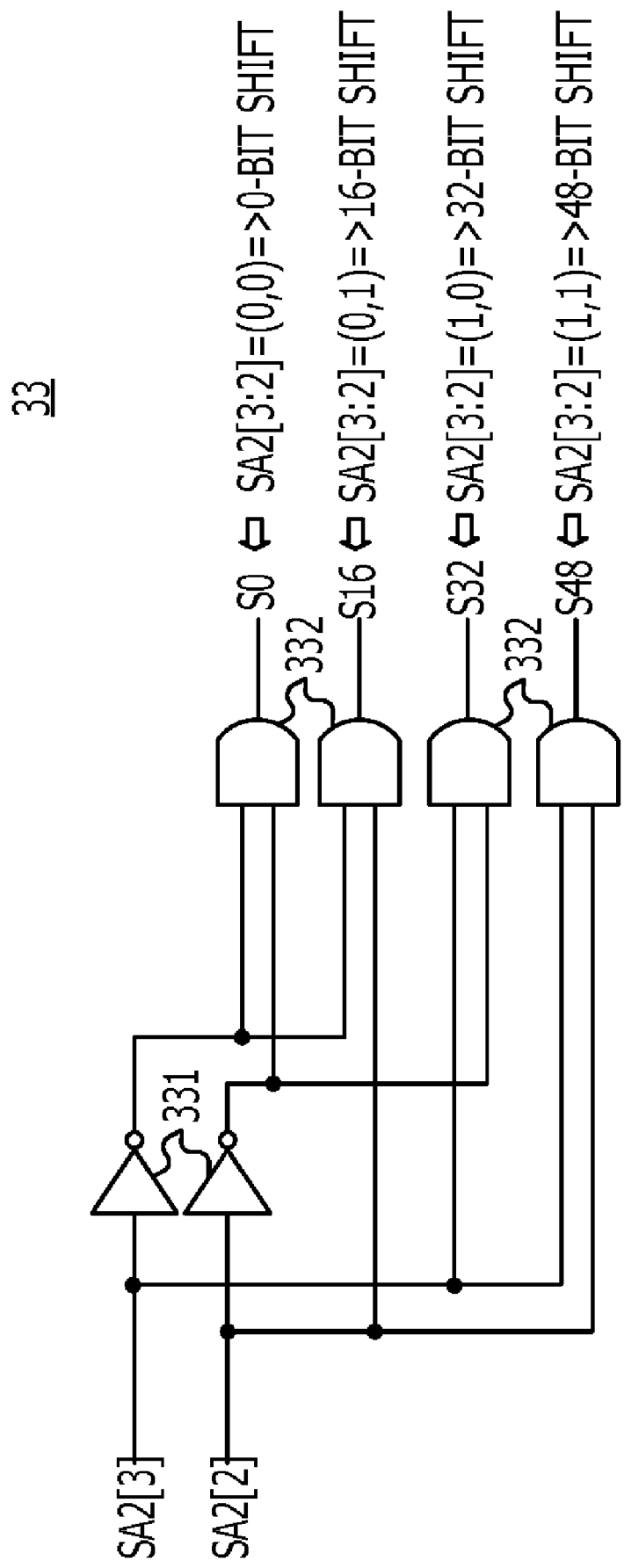
FIGS. 20A and 20B are circuit diagrams illustrating an example of a rotator making up a third shifter.
Figure 20B:
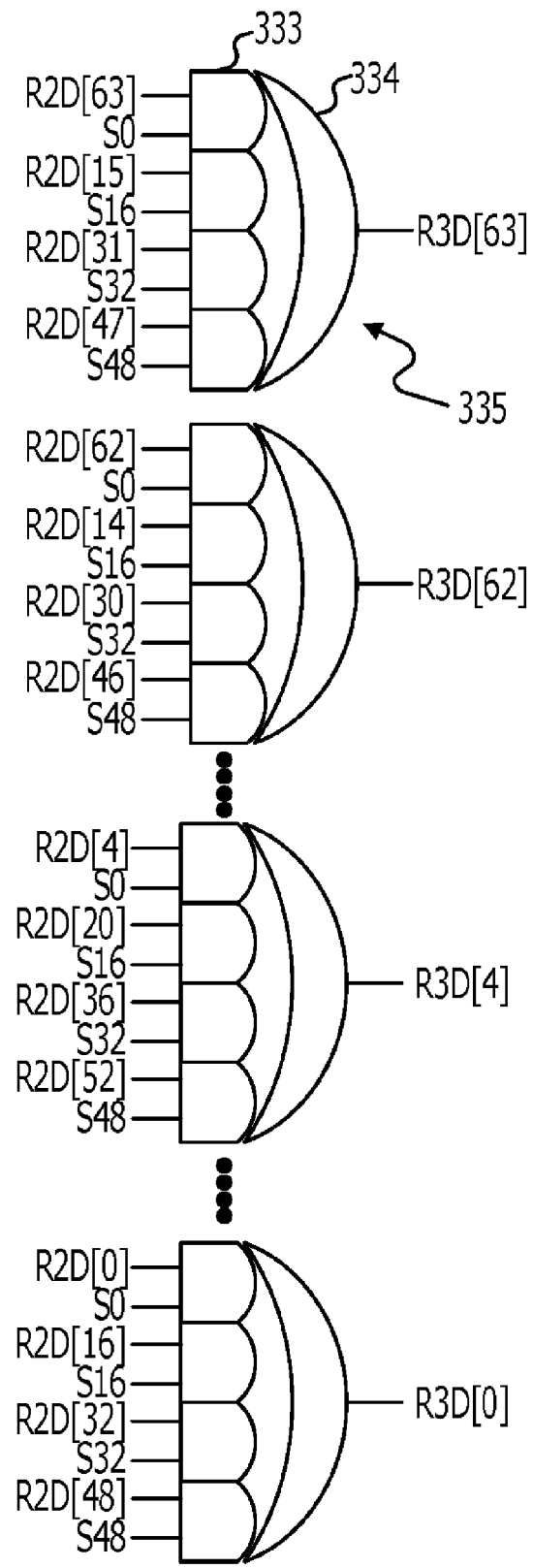

FIGS. 20A and 20B are circuit diagrams illustrating an example of a configuration of the rotator 32. To facilitate description, only signals relating to the output data R2D of the rotator 32 are illustrated in FIGS. 20A and 20B. R2D[63:0] corresponding to the results of right rotate shift of 0 bits, 4 bits, 8 bits, and 12 bits at the rotator 32.

The rotator 33 has two inverters 331 and four AND circuits 332, and 64 4-to-1 selectors 335 as illustrated in FIG. 20. The 4-to-1 selectors 335 are each realized by an AND-OR circuit having four AND circuits 333 and one OR circuit 334. The circuit portion having two inverters 331 and four AND circuits 332 generates selection signals S0, S16, S32 and S48 from 2-bit shift amount SA2[3:2]. The selection signals S0, S16, S32, and S48 indicate rotate shift of 0 bits, 16 bits, 32 bits, and 48 bits, respectively. Note that R3D and R3P in FIG. 18 show the results of right rotate shift (right rotate shift of 0 bits, 16 bits, 32 bits, and 48 bits) on the data and parity by the rotator 33.

With the present embodiment, shift is performed in 4-bit increments, so it is sufficient for the mask circuit to performing mask processing every 4 bits. With the present embodiment, the data width of the input data D is 64 bits, so 16 masks, (0) through (15), are generated as illustrated in FIG. 21. The conditions under which the mask becomes 0 by right rotate shift are as follows. Forming a logic circuit so that the following conditions are satisfied enables mask processing by the mask circuit 34.

Figure 22:
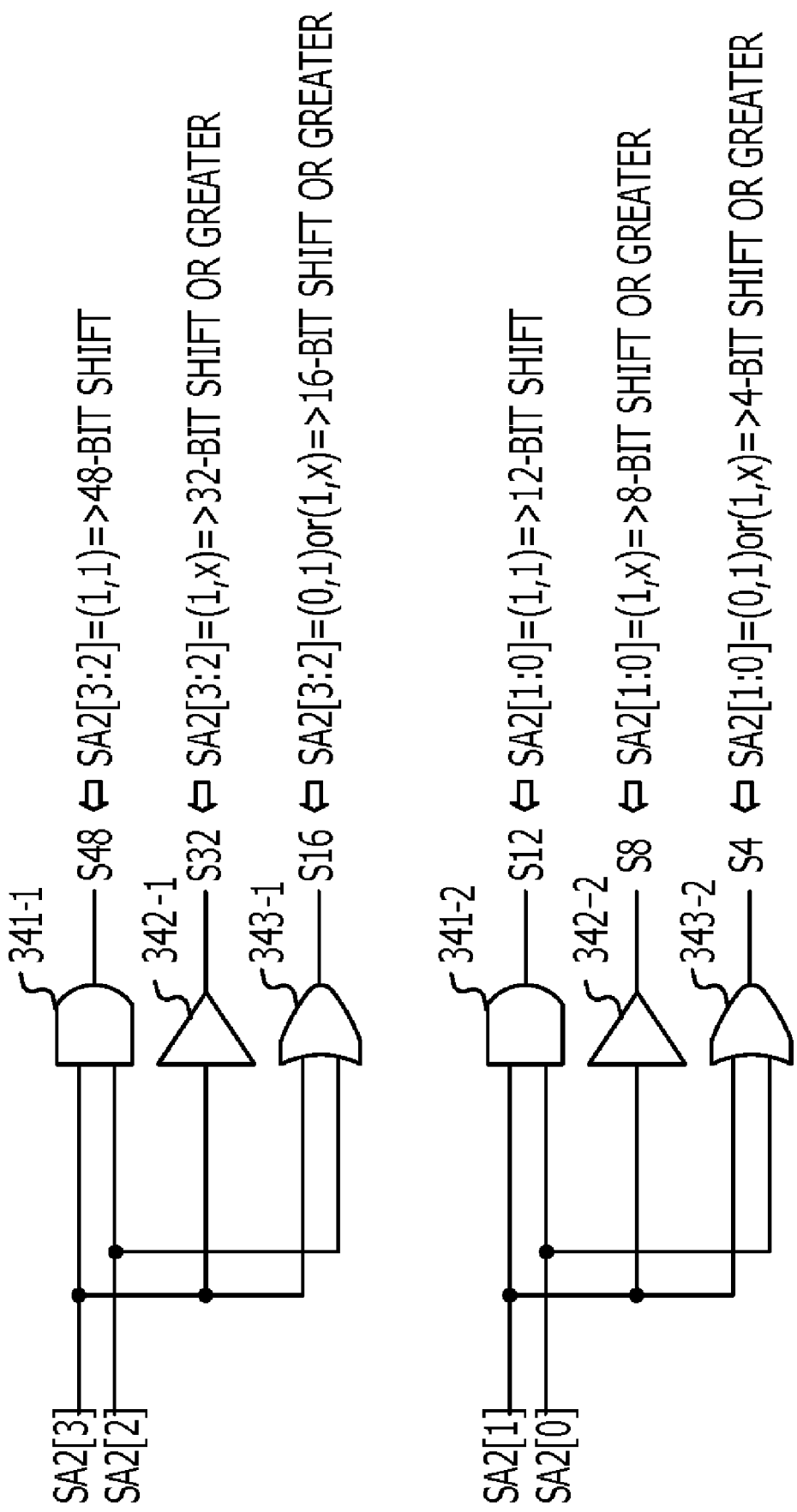
FIG. 22 is a circuit diagram illustrating an example of a selection signal generating circuit within a mask circuit.
Figure 23:
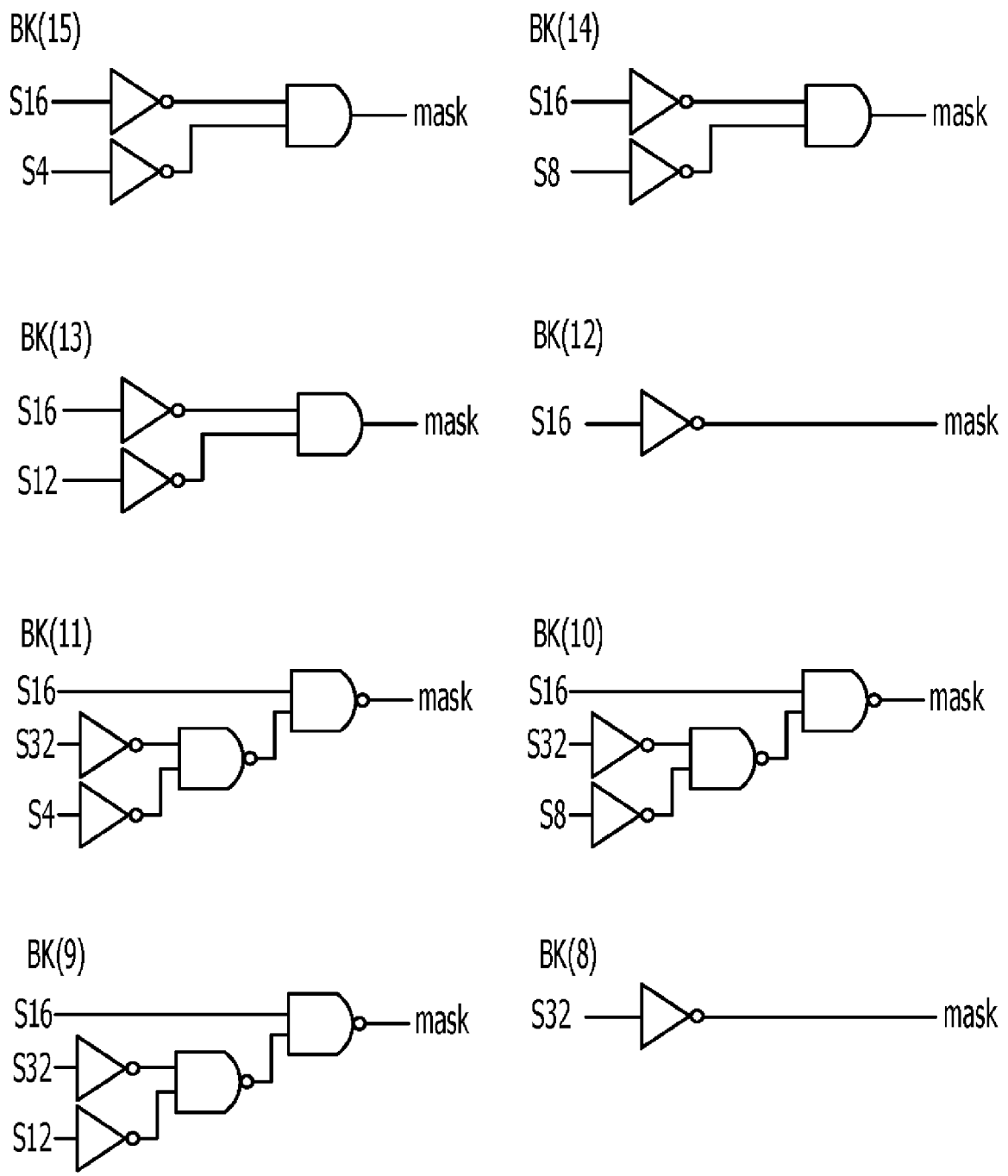
FIG. 23 is a circuit diagram illustrating an example of a mask signal generating circuit within the mask circuit.
Figure 24:
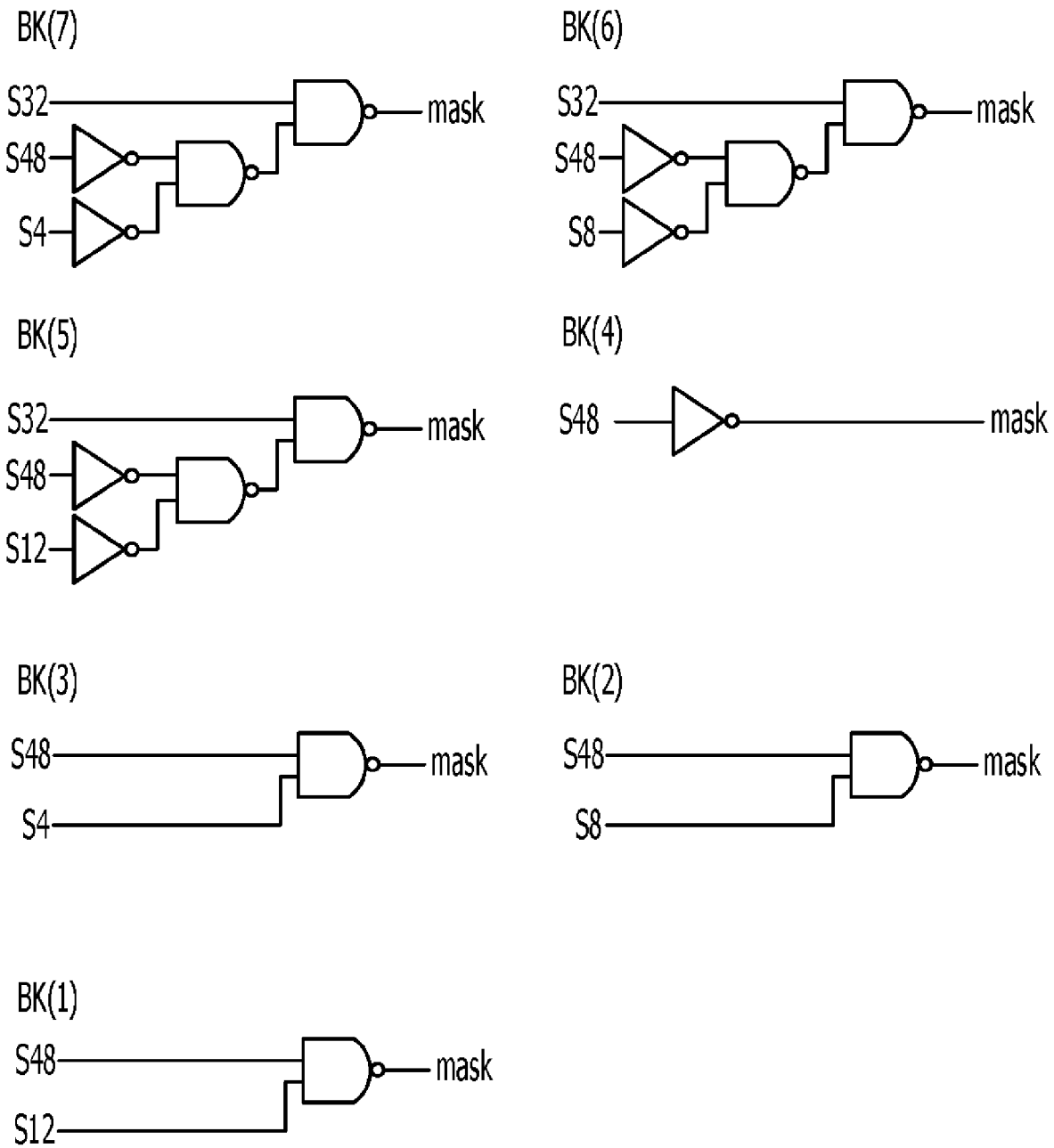
FIG. 24 is a circuit diagram illustrating an example of a mask signal generating circuit within the mask circuit.

FIGS. 22 through 24 illustrate an example of a mask 34 made with the condition that the mask becomes 1 by right rotate shift. FIG. 22 is a circuit diagram illustrating an example of a selection signal generating circuit within the mask circuit 34, and FIGS. 23 and 24 are circuit diagrams illustrating an example of a selection signal generating circuit within the mask circuit 34.

The selection signal generating circuit illustrated in FIG. 22 has two selection signal generating circuits, which are a first selection signal generating circuit and a second selection signal generating circuit. The first selection signal generating circuit has an AND circuit 341-1, a buffer circuit 342-1, and an OR circuit 343-1, and generates selection signals S48, S32, S16 from 2-bit shift amount SA2[3:2].

The selection signals S48, S32, and S16 indicate shift of 48 bits, shift of 32 bits or more, and shift of 16 bits or more, respectively. The second selection signal generating circuit has an AND circuit 341-2, a buffer circuit 342-2, and an OR circuit 343-2, and generates selection signals S12, S8, S4 from 2-bit shift amount SA2[1:0]. The selection signals S12, S8, and S4 indicate shift of 12 bits, shift of 8 bits or more, and shift of 4 bits or more, respectively. The selection signals S48, S32, S16, S12, S8, and S4 are signals for the mask circuit 34, and are different signals from the selection signals described with reference to FIGS. 19 and 20.

FIG. 23 illustrates circuit blocks BK15 through BK8 for generating mask (15) through mask (8). The circuit block BK(15) has two inverter circuits and one AND circuit, and generates a mask signal "mask" equivalent to mask (15), based on selection signals S16 and S4.

The circuit block BK(14) has two inverter circuits and one AND circuit, and generates a mask signal "mask" equivalent to mask (14), based on selection signals S16 and S8.

The circuit block BK(13) has two inverter circuits and one AND circuit, and generates a mask signal "mask" equivalent to mask (13), based on selection signals S16 and S12.

The circuit block BK(12) has one inverter circuit, and generates a mask signal "mask" equivalent to mask (12), based on selection signal S16.

The circuit block BK(11) has two inverter circuits and two NAND circuits, and generates a mask signal "mask" equivalent to mask (11), based on selection signals S16, S32, and S4.

The circuit block BK(10) has two inverter circuits and two NAND circuits, and generates a mask signal "mask" equivalent to mask (10), based on selection signals S16, S32, and S8.

The circuit block BK(9) has two inverter circuits and two NAND circuits, and generates a mask signal "mask" equivalent to mask (9), based on selection signals S16, S32, and S12.

The circuit block BK(8) has one inverter circuit, and generates a mask signal "mask" equivalent to mask (8), based on selection signal S32.

FIG. 24 illustrates circuit blocks BK7 through BK1 for generating mask (7) through mask (1). The circuit block BK(7) has two inverter circuits and two NAND circuits, and generates a mask signal "mask" equivalent to mask (7), based on selection signals S32, S48, and S4.

The circuit block BK(6) has two inverter circuits and two NAND circuits, and generates a mask signal "mask" equivalent to mask (6), based on selection signals S32, S48, and S8.

The circuit block BK(5) has two inverter circuits and two NAND circuits, and generates a mask signal "mask" equivalent to mask (5), based on selection signals S32, S48, and S12.

The circuit block BK(4) has one inverter circuit, and generates a mask signal "mask" equivalent to mask (4), based on selection signal S48.

The circuit block BK(3) has one NAND circuit, and generates a mask signal "mask" equivalent to mask (3), based on selection signals S48 and S4.

The circuit block BK(2) has one NAND circuit, and generates a mask signal "mask" equivalent to mask (2), based on selection signals S48 and S8.

The circuit block BK(1) has one NAND circuit, and generates a mask signal "mask" equivalent to mask (1), based on selection signals S48 and S12.

Next, description will be made regarding conditions where a mask becomes 0 with left rotate shift. With the present embodiment, rotators 32 and 33 are used, so the conditions where a mask becomes 0 with left rotate shift can be the inverse of conditions where a mask becomes 0 with right rotate shift. However, the 2τ'th shift amount SA2 is the results of the lower four bits of (16−SA[5:2]), so inversion is unnecessary when SA2[3:0]=0000. A mask for left rotate shift can be generated by inversion of a right rotate shift mask, except for when SA2[3:0]=0000.

Data output is selected as illustrated in FIG. 25 to support sign extension for when performing mask processing. MASK represents a mask signal to take the output of the rotator 33 as the result of right shift or left shift, SELR is a left/right selection signal, RSGN2 is a bit where the bit sign SIGN generated at the 1τ'th shift has been latched at the latch circuit 19, i.e., an input bit 63 at the time of SRA=1 for the signal SRA indicating arithmetic right shift.

Figure 26:
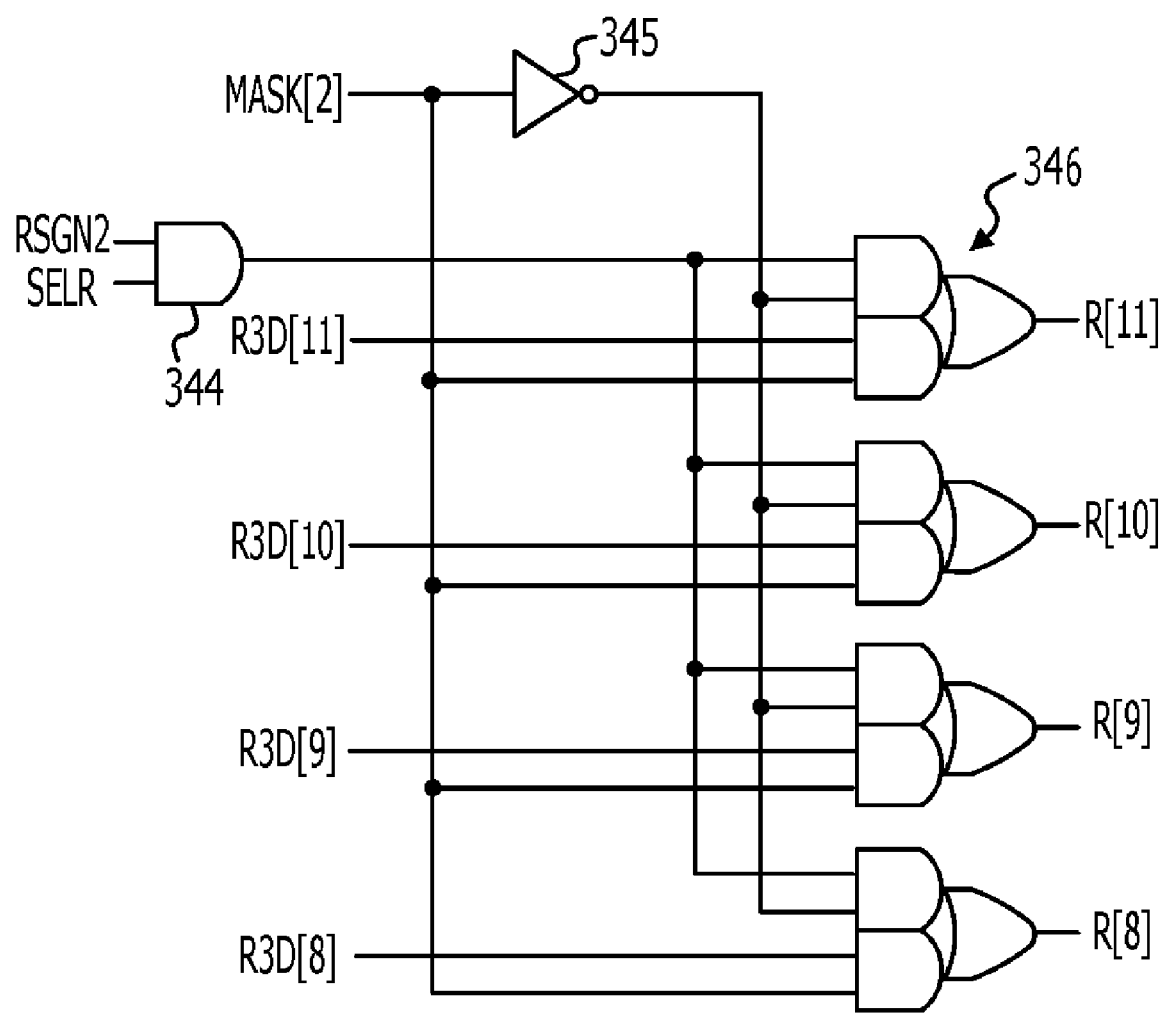
FIG. 26 is a circuit diagram illustrating an example of a data output selection circuit within the mask circuit.
Figure 27:
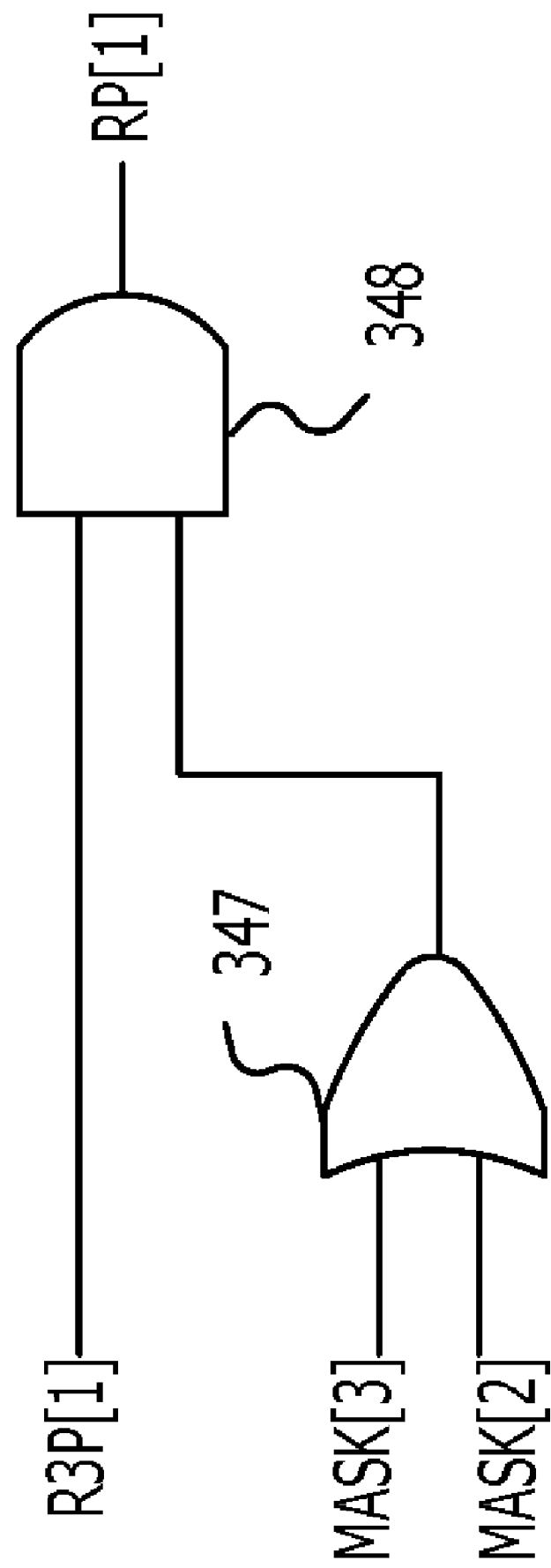
FIG. 27 is a circuit diagram illustrating an example of a parity output selection circuit within the mask circuit.

FIGS. 26 and 27 are circuit diagrams illustrating an example of a configuration of selection circuits within the mask circuit. FIG. 26 illustrates a data output selection circuit, and FIG. 27 illustrates a parity output selection circuit.

The data output selection circuit illustrated in FIG. 26 includes one AND circuit 344, one inverter 345, and four 2-to-1 selectors 346. The 2-to-1 selectors 346 are realized by an AND-OR circuit having two AND circuits and one OR circuit. The output selection circuit illustrated in FIG. 26 performs selection processing of 4 bits worth of data R3D, which is the results of right rotate shift by the rotator 33.

The parity output selection circuit illustrated in FIG. 27 includes one OR circuit 347 and one AND circuit 348. The parity output selection circuit illustrated in FIG. 27 performs selection processing of 1 bit of parity R3P, which is the result of right rotate shift by the rotator 33.

Description regarding right rotate shift of parity at the rotators 32 and 33 will be made. The basic concept is the same as with the case of right rotate shift of data.

Description regarding shift of parity corresponding to right rotate shift of 0 bits, 4 bits, 8 bits, and 12 bits of data carried out at the rotator 32 will be made. In this case, with byte parity at the time of 0-bit right rotate shift as R0BP[7:0] and byte parity at the time of 4-bit right rotate shift as R4BP[7:0], parities R0BP[7] through R0BP[0] and R4BP[7] through R4BP[0] are expressed as illustrated in FIG. 28 by the output parity SDP[15:0] of the latch circuit 16.

The byte parity at the time of 8-bit right shift is equivalent to the 8 bits of R0BP[0], R0BP[7:1], and the byte parity at the time of 12-bit right shift is equivalent to the 8 bits of R4BP[0], R4BP[7:1]. Accordingly, the R0BP[7:0] and R4BP[7:0] can be selected with a selector the same as the 4-to-1 selector 325 illustrated in FIG. 19. Note that conversion from SDP[15:0] to R0BP[7:0], R4BP[7:0] is performed at the conversion circuit 37 illustrated in FIG. 18.

Next, description regarding shift of parity corresponding to right rotate shift of 0 bits, 16 bits, 32 bits, and 48 bits of data carried out at the rotator 33 will be made. This case involves byte (8-bit) parity, so shift can be performed in the same way as performing 0-bit, 2-bit, 4-bit, and 6-bit right rotate shift on 8-bit data. With parity following shift as RBP[7:0], parity RBP[2:1] for example is as illustrated in FIG. 29.

With mask processing where right shift or left shift results are obtained from rotate shift at the rotator 33, the output parity is byte parity, so masks need to be generated in increments of bytes. Accordingly, masks are generated by taking the OR of masks in 4-bit increments, such as B MASK[0]=MASK[1]|MASK[0]. However, due to being formed in 4-bit increments, with the rotator 33 there may be a boundary condition occurring in which one four bits is MASK=0 and the other four bits is MASK=1 through masks in increments of four bits. For example, in the case of right shift of 20 bits, the results with masks in 4-bit increments and with masks in 8-bit increments is as illustrated below, where it can be seen that a "?" portion can occur as a boundary condition.

Mask in 4-bit increments: 0000011111111111

Mask in 8-bit increments: 0 0 ? 1 1 1 1 1

Boundary conditions with the 8-bit mask can be taken into consideration at the time of generating byte parity, by setting to "1" by taking the OR. The parity at the boundary portion is generated as "0" for the four bits. The boundary portion is the leading parity at the rotator 33 in 4-bit increments. Accordingly, instead of obtaining the parity R4BP[7] by XOR of SDP[0] and SDP[15] as illustrated in FIG. 28, R4BP[7]=SELR?(0^SDP[15]):(SDP[0]^0) can be performed, as illustrated below. Note that the caret "^" means XOR.

When SELR=1:R4BP[7]=SDP[15]

When SELR=0:R4BP[7]=SDP[0]

With the present embodiment, a first shifter having a right shifter performing right shift and a left shifter performing left shift of 0 to 3 bits of input data with a data width of N (64) in accordance with left/right selection signals are formed of the shifters 13-1 and 14-1. Also, a rotator for executing 0 to N−4 bit right rotate shift or left rotate shift on output data from the first shifter in accordance with left/right selection signals, based on the shift amount of 4 bits or more, are configured of the rotators 32 and 33. Further, mask for performing mask processing in 4-bit increments as to output data from the rotator, are configured of the mask circuit 34.

Thus, by realizing the 2τ'th shift with the right-shift based rotators 32 and 33 and mask processing with the mask circuit 34, the left shifters 14-2 and 14-3 and the selector 18 which are necessary in the example in FIG. 4 can be done away with, and circuit portions corresponding to the left shifters 14-2 and 14-3 in the conversion circuit 17 can also be omitted. A circuit for performing mask processing with the mask circuit 34 that is used instead of the unnecessary circuits can be formed with relatively simple circuits such as selectors or the like, and can be realized with a relatively small number of transistors. Accordingly, the circuit scale of the shift calculator 31 can be reduced relatively, the mounting area can be reduced relatively, and standby power/static power can also be reduced relatively.

By performing the 2τ'th shift with the rotators 32 and 33, there may be some increase in wiring length at some places. However, with the present embodiment, the number of logical steps from the 2τ'th data input or shift amount input up to output of the shift results is almost unchanged from the example in FIG. 4. Also, with the example in FIG. 4, the 2τ'th right shift and left shift are performed separately, but with the present embodiment, the 2τ'th right shift and left shift are performed by the rotators 32 and 33, and the overall wiring length can be reduced as compared to FIG. 4, so active (or dynamic) power can be reduced accordingly. Charging/discharging of capacitive load is the primary cause of active power, and the longer the wiring is, the greater the active power is. Further, the overall wiring length is reduced as compared to the example in FIG. 4, so the problem of signal delay is also alleviated.

Next, a shift calculator according to a second embodiment of the present invention will be described. With the first embodiment, the data width of the input data was 64 bits. With the second embodiment, the data width of the input data is 128 bits.

A shift calculator is used for performing logical shift and arithmetic shift. For example, a shift calculator having an input/output data width of 128 bits and a shift amount of 0 to 127 bits has right shift functions and left shift functions, and performs logical shift and arithmetic shift.

Figure 30:
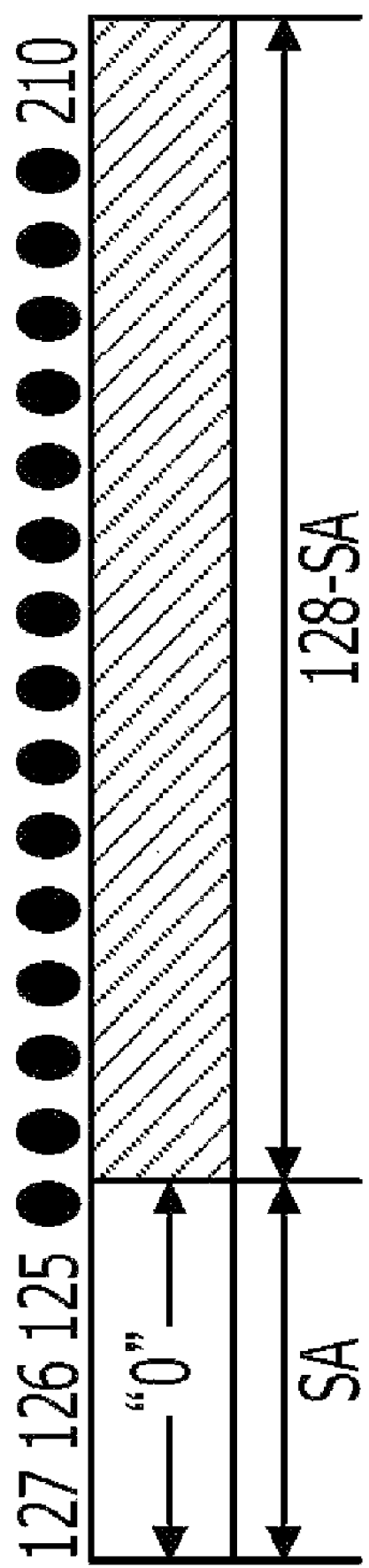
FIG. 30 is a diagram illustrating 0 to 127 bit logical right shift.
Figure 31:
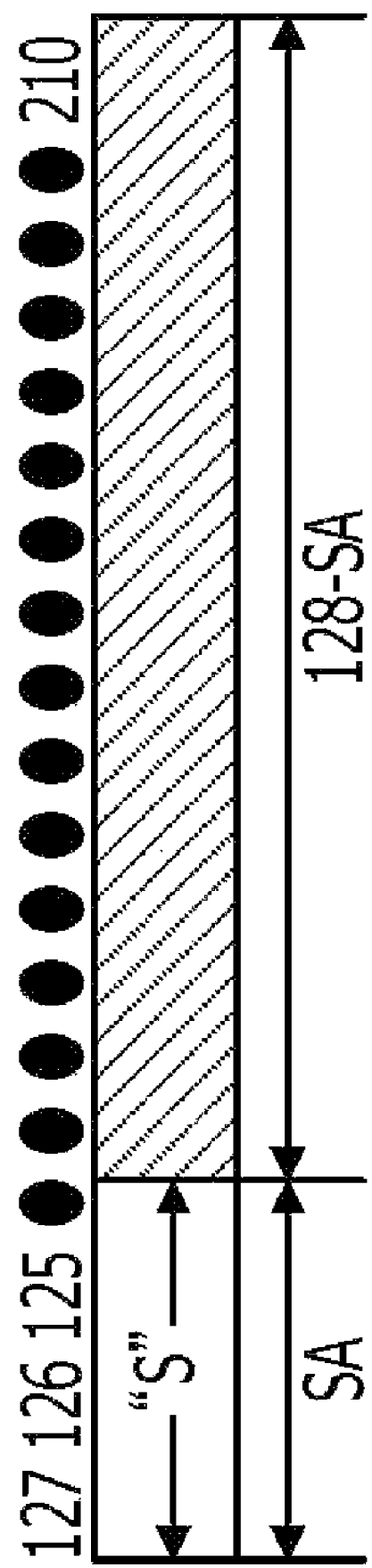
FIG. 31 is a diagram illustrating 0 to 127 bit arithmetic right shift.
Figure 32:
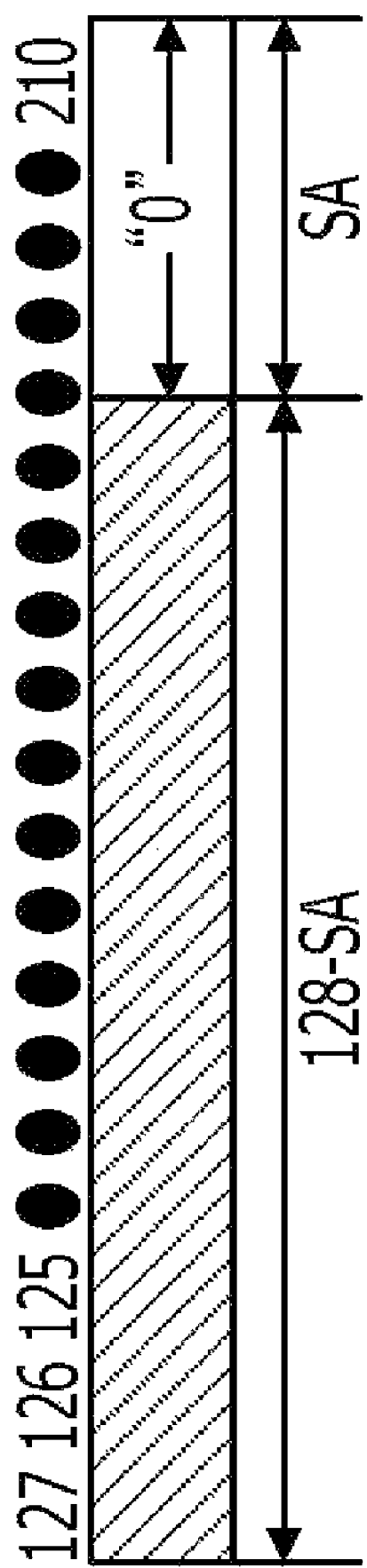
FIG. 32 is a diagram illustrating 0 to 127 bit logical left shift.

FIG. 30 illustrates logical right shift of 0 to 127 bits, FIG. 31 illustrates arithmetic right shift of 0 to 127 bits, and FIG. 32 illustrates logical left shift of 0 to 127 bits. In FIGS. 30 through 32, SA represents shift amount, with $0 \leq SA \leq 127$ holding. The difference between arithmetic right shift and logical right shift is whether or not there is extension of the sign SIGN. In the case of arithmetic right shift, the sign SIGN (far left bit of the input data) is set at the portion shifted in, instead of a "0".

In FIG. 31, S denotes the bit for the sign SIGN (bit 127). Also, there may be cases of shifting parity-protected data, so byte parity is assumed for the input/output data. Parity protection assumes parity propagation, so in the event that there the input data and input parity are unmatched, the output data and output parity need to be unmatched at some point following shifting.

Figure 33:
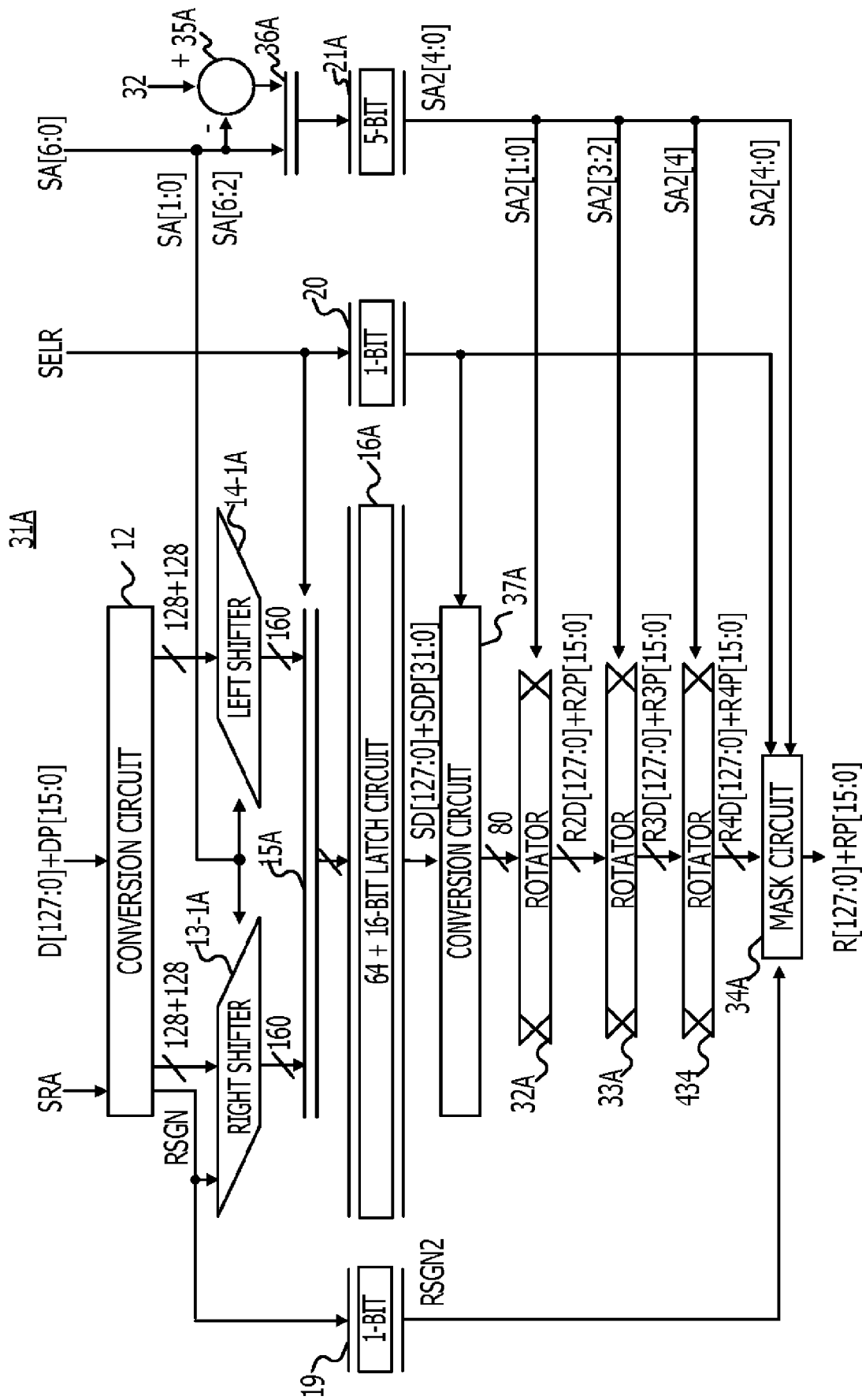
FIG. 33 is a diagram illustrating a shift calculator according to a second embodiment of the present invention.

FIG. 33 is a diagram illustrating a shift calculator according to the second embodiment. In FIG. 33, portions which are substantially the same as those in FIG. 18 are indicated by the reference numerals being suffixed with an "A", and description thereof will be omitted. The parts of the shift calculator 31A are each different from the corresponding parts in the shift calculator 31 illustrated in FIG. 18 as far as the number of bits is concerned, but the basic operations of the parts are the same as the corresponding parts in the shift calculator 31 illustrated in FIG. 18. Note that in FIG. 33, SD[127:0] represents the output data of the latch circuit 16A, SDP[31:0] represents the output parity of the latch circuit 16A, SA2 indicates the 2τ'th shift amount, and RSGN2 indicates a bit where the bit sign SIGN generated at the 1τ'th shift has been latched at the latch circuit 19.

With the present embodiment, output of the rotator 434 is masked by the mask circuit 34A in accordance with mask signals generated from the 2τ'th shift amount SA2, thereby performing right shift and left shift of the 128 bit data. With the shift amount as SA[6:0] and the 2τ'th shift amount SA2 as SA2[4:0], SA2[3:0]=SA[5:2] holds in the example illustrated in FIG. 4, but data shift by the calculator circuit 35A, selector 36A, and latch circuit 21A is realized by defining as follows.

SELR=0:SA2[4:0]=32 (100,000 in binary)−SA[6:2]

SELR=1:SA2[4:0]=SA[6:2]

Figure 34A:
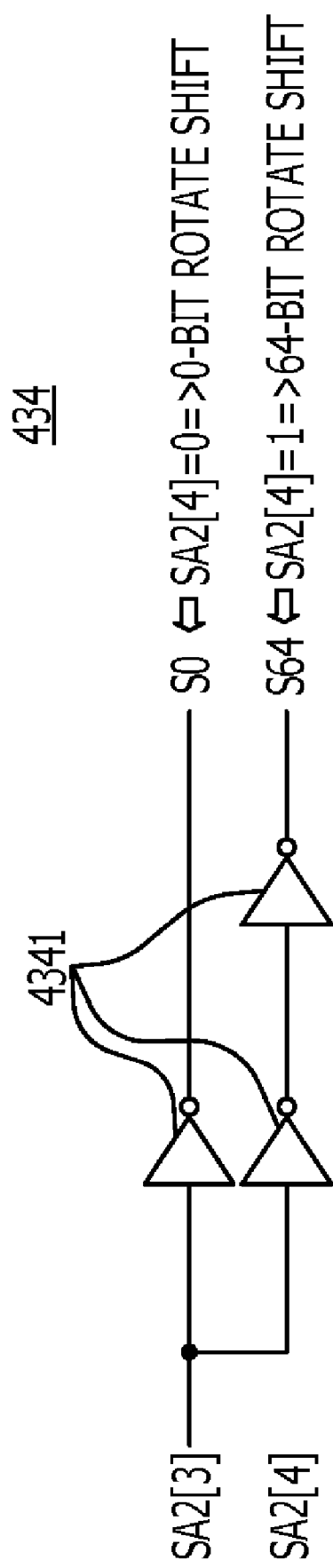
FIGS. 34A and 34B are circuit diagrams illustrating an example of a rotator making up a fourth shifter.
Figure 34B:
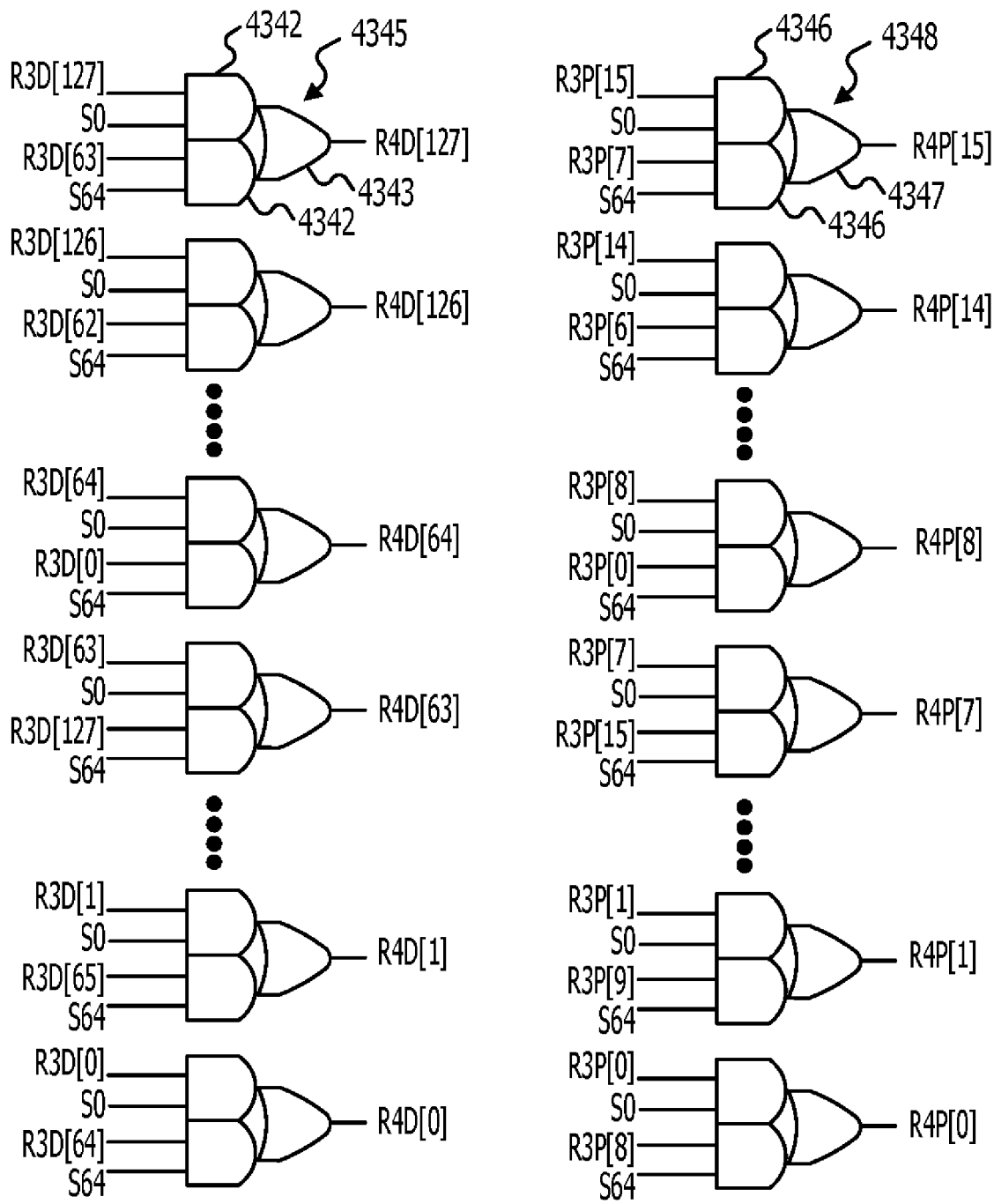

FIGS. 34A and 34B are circuit diagrams illustrating an example of a configuration of the rotator 434. The rotator 434 has three inverters 4341, 128 2-to-1 selectors 4345, and 16 2-to-1 selectors 4348, connected as illustrated in FIGS. 34A and 34B. The 2-to-1 selectors 4345 are each realized by an AND-OR circuit having two AND circuits 4342 and one OR circuit 4343. Also, the 2-to-1 selectors 4348 are each realized by an AND-OR circuit having two AND circuits 4346 and one OR circuit 4347. The circuit unit having three inverters 4341 generates selection signals S0 and S64 from 1-bit shift amount SA2[4]. The selection signals S0 and S64 indicate rotate shift of 0 bits and 64 bits, respectively. R4D and R4P represent the results of rotate right shift (right shift of 0 bits and 64 bits) as to the data and parity by the rotator 434.

The rotators 32A and 33A are used as two-stage 4-to-1 selectors, and the rotator 434 is used as a 2-to-1 selector, thereby performing right rotate shift of 0 to 124 bit data in increments of 4 bits. The rotator 32A performs 0-bit, 4-bit, 8-bit, and 12-bit right rotate shift, the rotator 33A performs 0-bit, 16-bit, 32-bit, and 48-bit right rotate shift, and the rotator 434 making of a fourth shifter performs right rotate shift of 0 bits and 64 bits.

Due to 4-bit shift being performed as described above, it is sufficient for the mask circuit 34A to perform mask processing for each 4 bits. With the present embodiment, the data width of the input data D is 128 bits, so 32 masks, (0) through (31), are generated as illustrated in FIG. 35. The conditions under which the mask becomes 0 by right rotate shift are as follows. Forming a logic circuit so that the following conditions are satisfied enables mask processing by the mask circuit 34A.

The configuration of the mask circuit 34A where a mask becomes 1 by right rotate shift should be readily understandable from the configuration of the mask circuit 34 according to the first embodiment.

Next, description regarding conditions where a mask becomes 0 with left rotate shift will be made. With the present embodiment, rotators 32A, 33A, and 434 are used, so the conditions where a mask becomes 0 with left rotate shift can be the inverse of conditions where a mask becomes 0 with right rotate shift. However, the 2τ'th shift amount SA2 is the results of the lower five bits of (32−SA[6:2]), so inversion is unnecessary when SA2[4:0]=00000. A mask for left rotate shift can be generated by inversion of a right rotate shift mask, except for when SA2[4:0]=00000.

Data output can be selected in the same way as with the first embodiment to support sign extension for when performing mask processing.

Also, right shift or left shift results can be obtained for parity in the same way as with data, by performing mask processing with the mask circuit 34A to the results of rotate processing by the rotators 32A, 33A, and 434.

Now, description regarding shift of parity corresponding to right rotate shift of 0 bits, 4 bits, 8 bits, and 12 bits of data will be made. In this case, with byte parity at the time of 0-bit right rotate shift as R0BP[15:0] and byte parity at the time of 4-bit right rotate shift as R0BP[15:0], parities R0BP[15] through R0BP[0] and R4BP[15] through R4BP[0] are expressed as illustrated in FIG. 36 by the output parity SDP[31:0] of the latch circuit 16A.

The byte parity at the time of 8-bit right rotate shift is equivalent to the 16 bits of R0BP[0], R0BP[15:1], and the byte parity at the time of 12-bit right rotate shift is equivalent to the 16 bits of R4BP[0], R4BP[15:1]. Accordingly, the R0BP[15:0] and R4BP[15:0] can be selected with a selector the same as the 4-to-1 selector 325 illustrated in FIG. 19.

Next, description regarding shift of parity corresponding to right rotate shift of 0 bits, 16 bits, 32 bits, and 48 bits of data will be made. This case involves byte (8-bit) parity, so shift can be performed in the same way as performing 0-bit, 2-bit, 4-bit, and 6-bit right rotate shift on 16-bit data. With parity before shift as R2P[15:0], and parity following shift as R3P[15:0], parity R3P[10:9] for example is as illustrated in FIG. 37.

Figure 38:
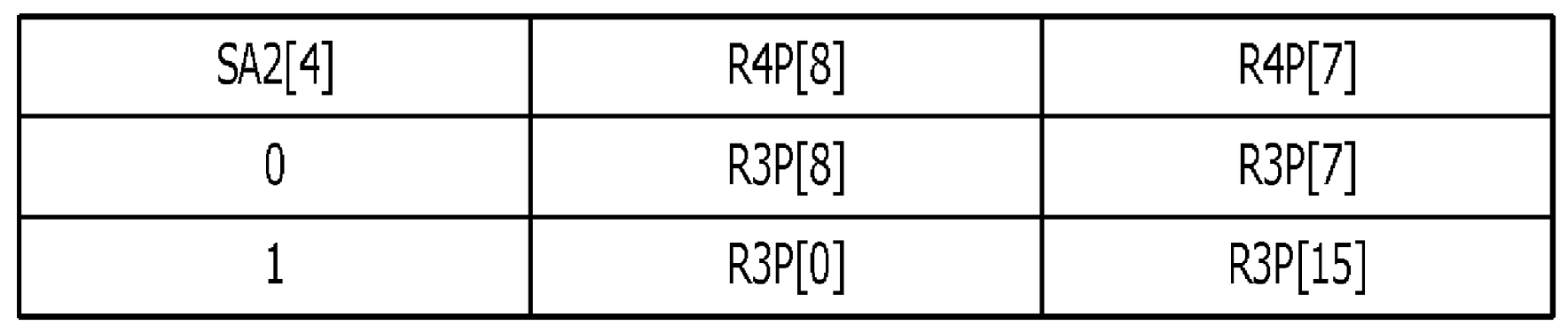

Next, description regarding shift of parity corresponding to right rotate shift of 0 bits and 64 bits of data will be made. This case involves byte (8-bit) parity, so shift can be performed in the same way as performing 0-bit and 8-bit right rotate shift on 16-bit data. With parity following shift as R4P[8:7], parity R4P[8:7] for example is as illustrated in FIG. 38.

The mask processing at the mask circuit 34A for obtaining the results of right shift or left shift from the results of rotate shift at the rotator 434 can be performed in the same way as with the method in the first embodiment. Boundary conditions with the 16-bit mask can be taken into consideration at the time of generating byte parity, by setting to "1" by taking the OR. The parity at the boundary portion is generated as "0" for the four bits. The boundary portion is the leading parity at the rotator 434 in 4-bit increments. Accordingly, instead of obtaining the parity R4BP[15] by XOR of SDP[0] and SDP[31] as illustrated in FIG. 36, R4BP[15]=SELR?(0^SDP[31]):(SDP[0]^0) can be performed, as illustrated below. The caret "^" means XOR.

When SELR=1:R4BP[15]=SDP[31]

When SELR=0:R4BP[15]=SDP[0]

With the present embodiment, first shifter having a right shifter performing right shift and a left shifter performing left shift of 0 to 3 bits of input data with a data width of N (128) in accordance with left/right selection signals, based on shift amount of 3 bits or left, are formed of the shifters 13-1 and 14-1. Also, a rotator for executing 0 to N−4 bit right rotate shift or left rotate shift on output data from the first shifter in accordance with left/right selection signals, based on the shift amount of 4 bits or more, is configured of the rotators 32A, 33A and 434. Further, a mask unit for performing mask processing in 4-bit increments as to output data from the rotator, is configured of the mask circuit 34A.

Thus, with the present embodiment, by realizing the 2τ'th shift with the right-shift based rotators 32A, 33A and 434 and mask processing with the mask circuit 34A, the left shifters 14-2 and 14-3 the selector 18, and a left shifter with shift width of 0, 64-bits (necessary due to 128 bits) which are necessary in the case of applying the example in FIG. 4 to a case of data width of 128 bits, can be done away with. Also, circuit portions corresponding to the left shifters in the conversion circuit 17 can be omitted as well.

A circuit wherein mask processing is performed with the mask circuit 34A which becomes necessary instead of the unnecessary circuits can be formed with relatively simple circuits such as selectors or the like, and can be realized with a relatively small number of transistors. Accordingly, the circuit scale of the shift calculator 31A can be reduced relatively, the mounting area can be reduced relatively, and standby power/static power can also be reduced relatively.

Note that by performing the 2τ'th shift with the rotators 32A, 33A, and 434, there may be some increase in wiring length at some places. However, with the present embodiment, the number of logical steps from the 2τ'th data input or shift amount input up to output of the shift results is almost unchanged from a case of applying input data with a data width of 128 bits to the example in FIG. 4. Also, with a case of applying a conventional example to input data with a data width of 128 bits, the 2τ'th right shift and left shift are performed separately, but with the present embodiment, this is performed by the rotators 32A, 33A, and 434, and the overall wiring length can be reduced as compared with conventional arrangements, so active (or dynamic) power can be reduced accordingly.

Charging/discharging of capacitive load is the primary cause of active power, and the longer the wiring is, the greater the active power is. Further, the overall wiring length is reduced as compared to the example in FIG. 4, so the problem of signal delay is also alleviated.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A shift calculator comprising:
   a first shifter includes a right shifter configured to perform a right shift of 0 to 3 bits and a left shifter configured to perform a left shift of 0 to 3 bits, on input data of which a data width is N bits, in accordance with left/right selection signals, based on a shift amount of 3 bits or smaller out of an input shift amount;
   a rotator configured to perform a right rotate shift of 0 to N−4 bits or a left rotate shift of 0 to N−4 bits, on output data from said first shifter, in accordance with said left/right selection signals, based on a shift amount of 4 bits or greater out of the input shift amount; and
   a mask unit configured to perform mask processing in 4-bit increments on output data from said rotator, based on mask signals.

2. The shift calculator according to claim 1, wherein said rotator generate said mask signals based on said shift amount of 4 bits or greater.

3. The shift calculator according to claim 1, further comprising means for performing sign extension for a right shift of 4 bits or greater in parallel with said mask processing, in a case of performing an arithmetic right shift.

4. The shift calculator according to claim 3, further comprising a latch circuit configured to latch a signal indicating the sign and supply the latched signal to said mask unit.

5. The shift calculator according to claim 1, wherein said mask unit performs mask processing on parity in the event that the data is parity-protected.

6. The shift calculator according to claim 1,
   wherein N=64;
   and wherein said rotator further includes
   a second shifter including a rotator configured to perform right rotate shift for data of 0 bits, 4 bits, 8 bits, and 12 bits, and
   a third shifter including a rotator configured to perform right rotate shift for data of 0 bits, 16 bits, 32 bits, and 48 bits.

7. The shift calculator according to claim 1,
   wherein N=128;
   and wherein said rotator further includes
   a second shifter including a rotator configured to perform a right rotate shift for data of 0 bits, 4 bits, 8 bits, and 12 bits,
   a third shifter including a rotator configured to perform a right rotate shift for data of 0 bits, 16 bits, 32 bits, and 48 bits, and
   a fourth shifter including a rotator configured to perform a right rotate shift for data of 0 bits and 64 bits.

8. The shift calculator according to claim 1, further comprising a latch circuit configured to latch said left/right selection signal indicating the sign and supply the latched signal to said mask unit.

9. The shift calculator according to claim 1, wherein said shift calculator operates at a cycles;
   and shift by said first shifter is performed at the $1\tau$'th shift, and shift by said rotator is performed at the $2\tau$'th shift.

10. The shift calculator according to claim 1, further comprising:
    a calculator configured to obtain the shift amount of said rotator of 4 bits or greater from a shift amount of 4 bits or greater out of input shift amount, and supply the obtained shift amount to said rotator and said mask unit.

* * * * *

UNITED STATES PATENT AND TRADEMARK OFFICE
CERTIFICATE OF CORRECTION

PATENT NO. : 8,392,491 B2
APPLICATION NO. : 12/827569
DATED : March 5, 2013
INVENTOR(S) : Kunihiko Tajiri It is certified that error appears in the above-identified patent and that said Letters Patent is hereby corrected as shown below:

In the Claims

Column 14, Line 29, In Claim 9, after "at", delete "a" and insert -- $2\tau$ --, therefor.

Signed and Sealed this
Second Day of July, 2013

Teresa Stanek Rea
*Acting Director of the United States Patent and Trademark Office*